(12) United States Patent  (10) Patent No.: US 12,506,907 B2
D'Amato  (45) Date of Patent: Dec. 23, 2025

(54) TECHNIQUES FOR DYNAMIC ROUTING

(71) Applicant: Sonos, Inc., Santa Barbara, CA (US)

(72) Inventor: Nicholas D'Amato, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 342 days.

(21) Appl. No.: 17/817,162

(22) Filed: Aug. 3, 2022

(65) Prior Publication Data

US 2023/0046698 A1  Feb. 16, 2023

Related U.S. Application Data

(60) Provisional application No. 63/233,117, filed on Aug. 13, 2021.

(51) Int. Cl.
*H04N 21/233* (2011.01)
*H04N 21/2387* (2011.01)
*H04N 21/439* (2011.01)

(52) U.S. Cl.
CPC ....... *H04N 21/233* (2013.01); *H04N 21/2387* (2013.01); *H04N 21/439* (2013.01)

(58) Field of Classification Search
CPC ................................ G06F 3/165; G06F 16/68
USPC ......................................................... 700/94
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Alexander Krzystan
(74) *Attorney, Agent, or Firm* — Finch & Maloney PLLC

(57) ABSTRACT

Disclosed herein are computing devices, including playback devices, that are configured to communicate data, such as audio data, to any number of target devices by dynamically taking into account the relevant context relating to the data to be communicated, the capabilities of the target devices, the states of communication links, and other contextual information.

19 Claims, 21 Drawing Sheets

(56) References Cited

U.S. PATENT DOCUMENTS

| | | |
|---|---|---|
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 9,774,966 B1* | 9/2017 | Budny ............... H04R 27/00 |
| 10,631,090 B1* | 4/2020 | Elliot ............... H04R 29/007 |
| 11,516,157 B1* | 11/2022 | da Jornada ............ H04L 51/02 |
| 11,825,282 B1* | 11/2023 | Leitman ............... H04R 5/02 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0138646 A1* | 9/2002 | Tsuboi ............... H04Q 11/0478 709/249 |
| 2003/0157951 A1 | 8/2003 | Hasty, Jr. |
| 2004/0024478 A1 | 2/2004 | Hans et al. |
| 2005/0078598 A1* | 4/2005 | Batra ............... H04L 1/0059 370/206 |
| 2007/0142944 A1 | 6/2007 | Goldberg et al. |
| 2011/0295394 A1* | 12/2011 | Zhao ............... G11B 27/105 700/94 |
| 2014/0143404 A1* | 5/2014 | Kennedy ............... H04L 67/52 709/224 |
| 2016/0011910 A1* | 1/2016 | Kang ............... G06F 9/5044 718/104 |
| 2017/0147579 A1* | 5/2017 | Foerster ............ G06F 16/90335 |
| 2021/0006915 A1* | 1/2021 | Hegde ............. H04N 21/43615 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

1100
Adding Player

```
Detect Presence of Guest Player
                           1105
          ↓
┌─ ─ ─ ─ ─ ─ ─ ─ ─ ─ ─ ─ ─ ─ ─┐
  Notification via Controller
  Application of Guest Player
                           1110
└─ ─ ─ ─ ─ ─ ─ ─ ─ ─ ─ ─ ─ ─ ─┘
          ↓
Determine Networking Capabilities
of Guest Player            1115
          ↓
Add Guest Player to Media
Playback System
                           1120
          ↓
Replicate Updated State
Information to Media Playback
System                     1125
```

*Fig. 11A*

1150
Losing Player

```
Detect Loss of All Connections to
Guest Player               1155
          ↓
┌─ ─ ─ ─ ─ ─ ─ ─ ─ ─ ─ ─ ─ ─ ─┐
  Notification via Controller
  Application of Lost Connection to
  Guest Player             1160
└─ ─ ─ ─ ─ ─ ─ ─ ─ ─ ─ ─ ─ ─ ─┘
          ↓
Remove Guest Player from Media
Playback System
                           1165
          ↓
Replicate Updated State
Information to Media Playback
System                     1170
```

*Fig. 11B*

TECHNIQUES FOR DYNAMIC ROUTING

CROSS REFERENCE TO RELATED APPLICATIONS

This application claims the benefits under 35 U.S.C. § 119(e) and Article 4 of the Paris Convention of U.S. Provisional Application No. 63/233,117 filed on Aug. 13, 2021 and titled "Techniques for Dynamic Routing," which is herein incorporated by reference in its entirety for all purposes.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY

Aspects and embodiments are directed to playback devices configured to communicate data, such as audio data, to any number of target devices by dynamically taking into account the relevant context relating to the data to be communicated, the capabilities of the target devices, the states of communication links, and other contextual information.

According to one embodiment, a playback device comprises a plurality of communication interfaces supporting a first plurality of communication capabilities, one or more amplifiers, one or more processors, and at least one non-transitory computer-readable medium comprising program instructions that are executable by the one or more processors such that the playback device is configured to: after identifying data that is to be communicated from the playback device to a target device, determine a second plurality of communication capabilities of the target device, determine a set of communication capabilities of the first plurality of communication capabilities that overlap with the second plurality of communication capabilities of the target device, determine a subset of communication capabilities of the set of communication capabilities that are available for communicating the data between the playback device and the target device, wherein the subset of communication capabilities that are determined to be available are determined to be available based on a context associated with at least one of: the playback device or the target device, determine, based on a data type associated with the data, a highest ranked communication capability from the subset of communication capabilities for communicating the data between the playback device and the target device, communicate the data between the playback device and the target device using the highest ranked communication capability, and facilitate playback of audio associated with the data by using the one or more amplifiers.

In one example, the at least one non-transitory computer-readable medium further comprises instructions that are executable by the one or more processors such that the playback device is configured to map the set of communication capabilities of the first plurality of communication capabilities that overlap with the second plurality of communication capabilities of the target device in a table.

In another example, the at least one non-transitory computer-readable medium further comprises instructions that are executable by the one or more processors such that the playback device is configured to determine the subset of communication capabilities based on the context associated with the playback device, wherein the context of the playback device comprises one or more of (i) an indication as to whether the playback device is currently communicating, (ii) sensor data obtained via a sensor associated with the playback device, (iii) a capability of the playback device, (iv) a quality of a connection associated with the playback device, (v) an amount of data traffic traversing to or from the playback device, or (vi) a device type of the playback device.

In one example, the at least one non-transitory computer-readable medium further comprises instructions that are executable by the one or more processors such that the playback device is configured to determine the subset of communication capabilities based on the context associated with the target device, wherein the context of the target device comprises one or more of (i) an indication as to whether the target device is currently communicating, (ii) sensor data obtained via a sensor associated with the target device, (iii) a capability of the target device, (iv) a quality of a connection associated with the target device, (v) an amount of data traffic traversing to or from the target device, or (vi) a device type of the target device.

In another example, the at least one non-transitory computer-readable medium further comprises instructions that are executable by the one or more processors such that the playback device is configured to adjust the communicating of the data in real time based at least in part on one or more of (i) changes in the highest ranked communication capability, (ii) changes in the context of the playback device, (iii) changes in the context of the target device, (iv) changes in rankings of communication capabilities in the subset of communication capabilities, or (v) changes in the subset of communication capabilities.

In another example, the at least one non-transitory computer-readable medium further comprises instructions that are executable by the one or more processors such that the playback device is configured to define a hierarchy for each type of data to be communicated between the playback device and the target device.

In another example, the at least one non-transitory computer-readable medium further comprises instructions that are executable by the one or more processors such that the playback device is configured to assign a priority level to each communication capability of the first and second plurality of communication capabilities in accordance with each type of data to be communicated between the playback device and the target device.

In certain examples, the data type associated with the data comprises at least one of: non-latency sensitive audio, latency sensitive audio, timing information, a control command, voice data, video data, augmented reality data, or virtual reality data.

In certain examples, the target device comprises at least one of: a target playback device, a controller, a cloud-based device, a television, a mobile device, or a tablet.

In some examples, the first plurality of communication capabilities or the second plurality of communication capabilities comprise at least one of: an optical communication capability, a radio frequency communication capability, or an acoustic communication capability, and wherein the data comprises the audio, the target device is a playback device, and wherein the playback device plays back the audio in synchrony with the target device.

Another embodiment is directed to a tangible, non-transitory computer-readable medium comprising instructions, which, when executed by one or more processors, causes a computing system to be configured to: after identifying data that is to be communicated to a target device from a playback device supporting a first plurality of communication capabilities, determine a second plurality of communication capabilities of the target device, determine a first set of communication capabilities of the first plurality of communication capabilities that overlap with the second plurality of communication capabilities of the target device, determine a first subset of communication capabilities of the second set of communication capabilities that are available for communicating the data between the playback device and the target device, wherein the first subset of communication capabilities that are determined to be available are determined to be available based on a context associated with at least one of: the playback device or the target device, determine, based on a data type associated with the data, a first highest ranked communication capability from the first subset of communication capabilities for communicating the data between the playback device and the target device, communicate the data between the playback device and the target device using the first highest ranked communication capability, and facilitate playback of audio associated with the data by using one or more amplifiers of the playback device.

In one example, the tangible, non-transitory computer-readable medium of claim 11, further comprises instructions which, when executed by the one or more processors, cause the computing system to be configured to determine whether the target device is not connected to a local area network connected to the playback device.

In another example, the tangible, non-transitory computer-readable medium of claim 12, further comprises instructions which, when executed by the one or more processors, cause the computing system to be configured to cause, if the target device is not connected to the local area network, the playback device to function as a gateway for the target device to bridge data traffic coming from the local area network to the target device.

In another example, the tangible, non-transitory computer-readable medium of claim 13, further comprises instructions which, when executed by the one or more processors, cause the computing system to be configured to communicate the data traffic coming from the local area network to the target device via the playback device functioning as the gateway by removing a preamble portion of a data packet associated with the data traffic and identifying the target device via a target device identifier present in a payload portion of the data packet.

In another example, the tangible, non-transitory computer-readable medium of claim 13, further comprises instructions which, when executed by the one or more processors, cause the computing system to be configured to identify a presence of a different target device via a short-range wireless broadcast.

In another example, the tangible, non-transitory computer-readable medium of claim 15, further comprises instructions which, when executed by the one or more processors, cause the computing system to be configured to determine a third plurality of communication capabilities of the different target device, and determine a second set of communication capabilities of the third plurality of communication capabilities of the different target device that overlap with the first plurality of communication capabilities of the playback device.

In another example, the tangible, non-transitory computer-readable medium of claim 16, further comprises instructions which, when executed by the one or more processors, cause the computing system to be configured to determine a second subset of communication capabilities of the second set of communication capabilities that are available for communicating different data between the playback device and the different target device, wherein the second subset of communication capabilities that are determined to be available are determined to be available based on the context associated with the playback device, a context associated with the different target device, or a combination thereof, determine a second highest ranked communication capability from the second subset of communication capabilities for routing the different data between the playback device and the different target device, and communicate the different data between the playback device and the target device using the second highest ranked communication capability.

In another example, the tangible, non-transitory computer-readable medium of claim 13, further comprises instructions which, when executed by the one or more processors, cause the computing system to be configured to dynamically adjust communicating of the data as the context of the playback device, the context of the target device, or a combination thereof, change.

In certain examples, the context of the playback device comprises an orientation of the playback device, a motion of the playback device, whether the playback device is operating, whether the playback device is performing an action, or a combination thereof, and wherein the context of the target device comprises an orientation of the target device, a motion of the target device, whether the target device is operating, whether the target device is performing an action, or a combination thereof.

According to another embodiment, a method performed by a playback device comprises after identifying data that is to be communicated to a target device from a playback device supporting a first plurality of communication capabilities, determining a second plurality of communication capabilities of the target device, determining a set of communication capabilities of the second plurality of communication capabilities of the target device that overlap with the first plurality of communication capabilities of the playback device, determining a subset of communication capabilities of the set of communication capabilities that are available for communicating data between the playback device and the target device, wherein the subset of communication capabilities that are determined to be available are determined to be available based on a context associated with the playback device, a context associated with the target device, or a combination thereof, determining, based on a data type associated with the data, a highest ranked communication capability from the subset of communication capabilities for routing the data between the playback device and the target device, and communicating the data between the playback device and the target device using the highest ranked communication capability.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 11A is a flow diagram for adding a playback device to a media playback system.

FIG. 11B is a flow diagram for losing a playback device from a media playback system.

Figure 1A:
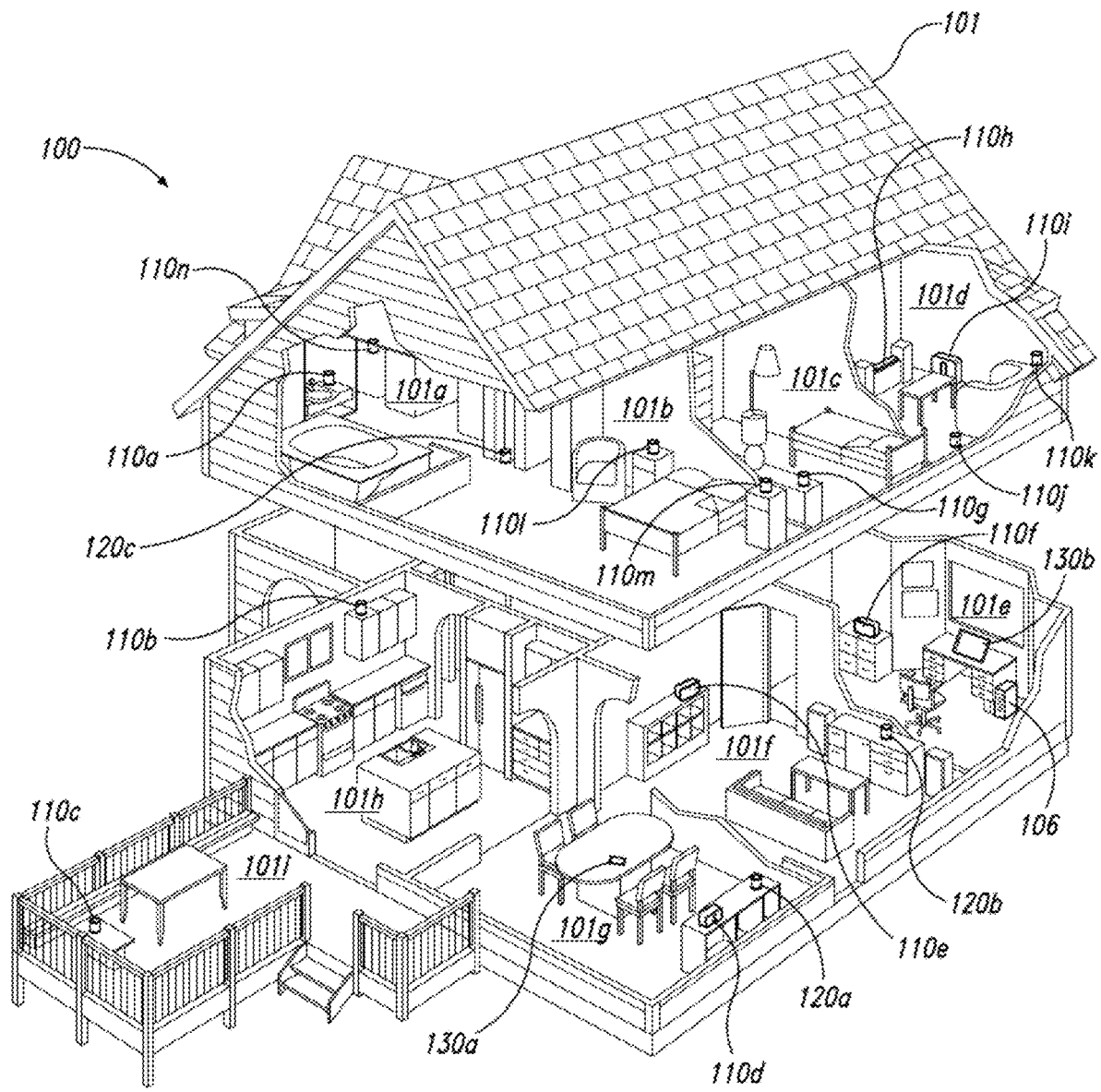
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Many existing playback devices and systems are inflexible in terms of how data, such as audio data, is communicated by and/or to such playback devices and systems. Indeed, in many instances, most, if not all, decisions in terms of what communication interface to use for conducting communications are hard coded into such playback devices and systems. For example, certain playback devices always use a WiFi radio (e.g. primarily the 2.4 GHz band in certain instances and 5 GHz in other instances) to communicate data to or from such playback devices, except in certain limited circumstances. Such limited circumstances may include using short-range wireless communication protocols, such as Bluetooth Low Energy (BLE), during a setup phase for setting up a playback device of a media playback system. As such, the inflexibility of existing playback devices leaves the reliability of data communication very highly dependent on the quality of a user's wireless LAN (WLAN) or other network. For instance, minor perturbations in the user's WLAN caused by other devices utilizing the communication resources of the WLAN may result in dropped data packets and/or audio dropouts for the playback device and/or systems communicating with the playback device. Such inflexibility is further exacerbated when other devices that may or may not be connected to the WLAN (or other network) seek to communicate data to and/or from the playback device.

Some embodiments of the playback devices and systems described herein improve upon the various shortcomings of existing playback devices and systems by (i) increasing the communication capabilities of the playback devices themselves; (ii) factoring into account the relevant context related to the data to be transmitted by and/or to the playback devices; (iii) accounting for the capabilities of a target device for communicating with the playback devices and systems; (iv) analyzing the states of communication links, playback devices, and/or target device(s); (v) determining which communication methods are available; and/or (vi) determining the best available communication method based on the type of data to be communicated and/or other parameters. Such features and functionality provided by the playback devices and systems described herein serve to provide a more dynamic and flexible approach to facilitating communication of data between playback devices, target devices, and/or systems. As a result, the playback devices and systems described herein provide a degree of flexibility to allow such playback devices and systems to reliably function in a wider variety of operating conditions, states, situations and use-case scenarios than currently possible.

In some embodiments, a playback device described herein may not only include WiFi radio and Bluetooth Low Energy (BLE) communication capabilities but may also incorporate a wide range of additional communication capabilities that may be employed to provide additional experiences and functionality for users. For example, a playback device may include one or more of: 2.4 GHz WiFi, 5 GHz WiFi, 6 GHz WiFi, BLE, Bluetooth Classic, Ultra-Wideband (UWB), Acoustic Signaling, and/or other communication capabilities. In certain embodiments, the playback device may even additionally include transceivers, radio frequency devices, and/or other componentry to facilitate communications for playback devices and to provide further communication capabilities.

In some embodiments, the playback devices, systems, and methods described herein may take into consideration a myriad of factors as it pertains to determining the context associated with the data to be communicated and how to communicate the data from a playback device to a target device or system and vice versa. For example, the playback devices, systems, and accompanying methods may employ information including (i) inputs gathered from sensors (e.g. is the playback device in motion or stationary, etc.); (ii) the capabilities of the target device (e.g. is the target device a playback device or other device with limited communication capabilities or perhaps more robust communication capabilities); (iii) the class or type of the target device and/or system (e.g. is the target device a playback device, a controller, a cloud system, etc.); (iv) the type of data to be transmitted; (v) the quality of a given connection between a playback device and a target device and/or traffic conditions associated with such connection; and/or (vi) whether other traffic is to be transmitted between the playback device and the target device (e.g. the playback device is currently functioning as a group coordinator for a plurality of devices and transmitting audio content to one or more other group members over a WLAN) to determine the relevant context associated with communicating the data and to determine how to communicate the data from a playback device to a target device and/or system.

In some embodiments, for example, a playback device having the following functionality may be provided herein. The playback device may include one or more communication interfaces supporting a first plurality of communication capabilities, one or more amplifiers for driving one or more transducers internal and/or external to the playback device, and/or any other componentry to facilitate playback of audio content, transmission of data, and/or manipulation of data. Additionally, the playback device may include one or more processors and one or more non-transitory computer-readable media that include instructions that are executable by the one or more processors such that the processors are configured to perform various operations supporting the functionality of the present disclosure. To that end, in some embodiments, the playback device may be configured to identify data that is to be communicated from the playback device to a target device, which may be another playback device, a network microphone device (NMD), a controller, a media playback system, and/or any other device. Once the data is identified (or at other desired times), the playback device may be configured to determine a second plurality of communication capabilities of the target device. Then, the playback device may be configured to determine a set of communication capabilities of the first plurality of communication capabilities supported by the playback device that overlap with the second plurality of communication capabilities. In some embodiments, the communication capabilities of the playback device and the communication capabilities of the target device may be mapped in a table implemented by the playback device, a system in communication with the playback device, and/or the target device.

In some embodiments, once the overlap in communication capabilities of the playback device and target device is determined, the playback device may be configured to determine a subset of the communication capabilities of the set of capabilities that is deemed available based on a context associated with at least one of the playback device or the target device. For example, a communication capability may be deemed available based on input data obtained from sensors of the playback device and/or target device, whether existing communications are occurring for the playback device and/or target device, communication link quality for the playback device and/or target device, and other factors that may be utilized to ascertain context.

Once the subset of available communication capabilities is determined, the playback device may be configured to determine a highest ranked communication capability (or best, optimal, or most preferred communication capability) from the subset of available communication capabilities. In some embodiments, the highest ranked communication capability may be determined based on a communication capability having a greatest suitability for transmission for the data type associated with the data, based on characteristics associated with the data to be communicated, based on whether the communication capability is already being used, based on a load currently experienced by a communication capability, based on a preference of a user, based on characteristics associated with the target device and/or the playback device, and/or based on other factors. In some embodiments, the highest ranked communication capability may be determined via a hierarchy that is defined for each class of data to be transmitted between a playback device and a target device. In such a hierarchy, for a given class, the hierarchy may define first, second, third, and/or lower tier options in terms of priority for a given communication capability.

In certain embodiments, once the highest ranked communication capability is determined, the playback device (or playback system) may be configured to communicate the data from the playback device to the target device by utilizing the highest ranked communication capability. In certain embodiments, the playback device (or playback system) may be configured to facilitate playback of audio content associated with the data by utilizing the one or more amplifiers of the playback device (or other componentry of the playback device).

In some embodiments, the playback device may be configured to modify the communication of the data in real time based in part on changing conditions experienced by the playback device, the target device, and/or potentially other devices and systems. For example, the playback device may be configured to adjust which communication capability is utilized to communicate data to the target device based on (i) changes in the highest ranked communication capability; (ii) changes in the context of the playback device itself; (iii) changes in the context of the target device itself; (iv) changes in rankings of the communication capabilities in the subset of communication capabilities; (v) changes in the subset of communication capabilities; and (vi) other changes warranting a change in the communication capability selected for transmission of the data.

In some embodiments, the playback device may be configured to have additional capabilities and functionality. For example, in instances where the playback device at a location (e.g. a household) is Off-LAN only (e.g. the playback device is not on a WLAN or other network), another playback device that is on the WLAN may function as a gateway device for the playback device that is Off-LAN only. In other words, the playback device serving as the gateway device may function as a bridge for the playback device that is Off-LAN through which data intended for the Off-LAN playback device may be transmitted, such as via another communication mechanism. In some embodiments, a routing table may be generated that includes an entry for the Off-LAN playback device that lists an internet protocol address of the playback device serving as the gateway device and an identifier for the target device (i.e. the Off-LAN playback device).

In some embodiments, the internet protocol address of the playback device serving as the gateway device may be included within a preamble of a data packet transmitted to the playback device service as the gateway device and the identifier of the Off-LAN device may be included within a payload of the data packet, which may also include other data such as a portion of audio content. In certain embodiments, when the playback device serving as the gateway device receives the data packet over the WLAN, the playback device may remove the preamble and see the identifier for the Off-LAN device in the payload of the packet. Based on the identifier, the playback device serving as the gateway device may be configured to forward the data to the Off-LAN device over a communication capability, such as a direct communication mechanism.

In some embodiments, the playback device may be configured to have further capabilities and functionality. In some embodiments, the playback device may be configured to facilitate guest player extensions into a media playback system. For example, temporary integration of a guest playback device may be facilitated by adding the guest playback device that may not be on a WLAN to a media playback system (or other group of connected devices). For example, the guest playback device may be configured to have Bluetooth communication capability but is not on a WLAN. A playback device on the WLAN may attempt to search for the guest device on the WLAN but may fail in doing so. The playback device may transmit a notification to a user via an application of the media playback system that includes the playback device inquiring as to whether the user wishes to add the guest playback device to the media playback system. If the user inputs a yes command, the playback device on the media playback system may attempt to establish a Bluetooth connection with the guest playback device and the connection may be established by pressing a button on the guest playback device or by performing another action with respect to the guest playback device. Once the guest playback device is connected to the media playback system, the playback device that facilitated the adding of the guest playback device may serve as a bridge for the guest playback device while the guest playback device is temporarily on the media playback system.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
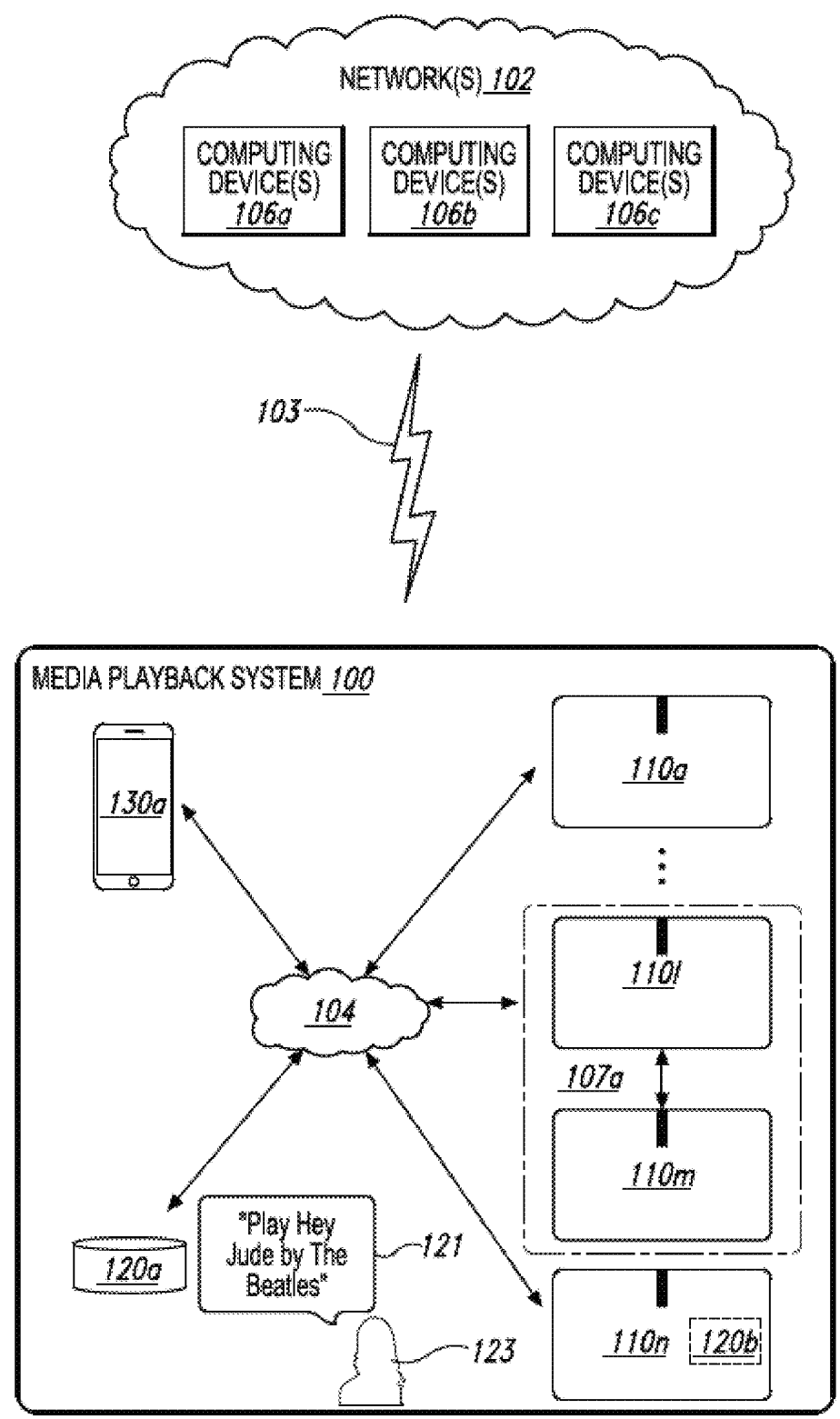
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices.

Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
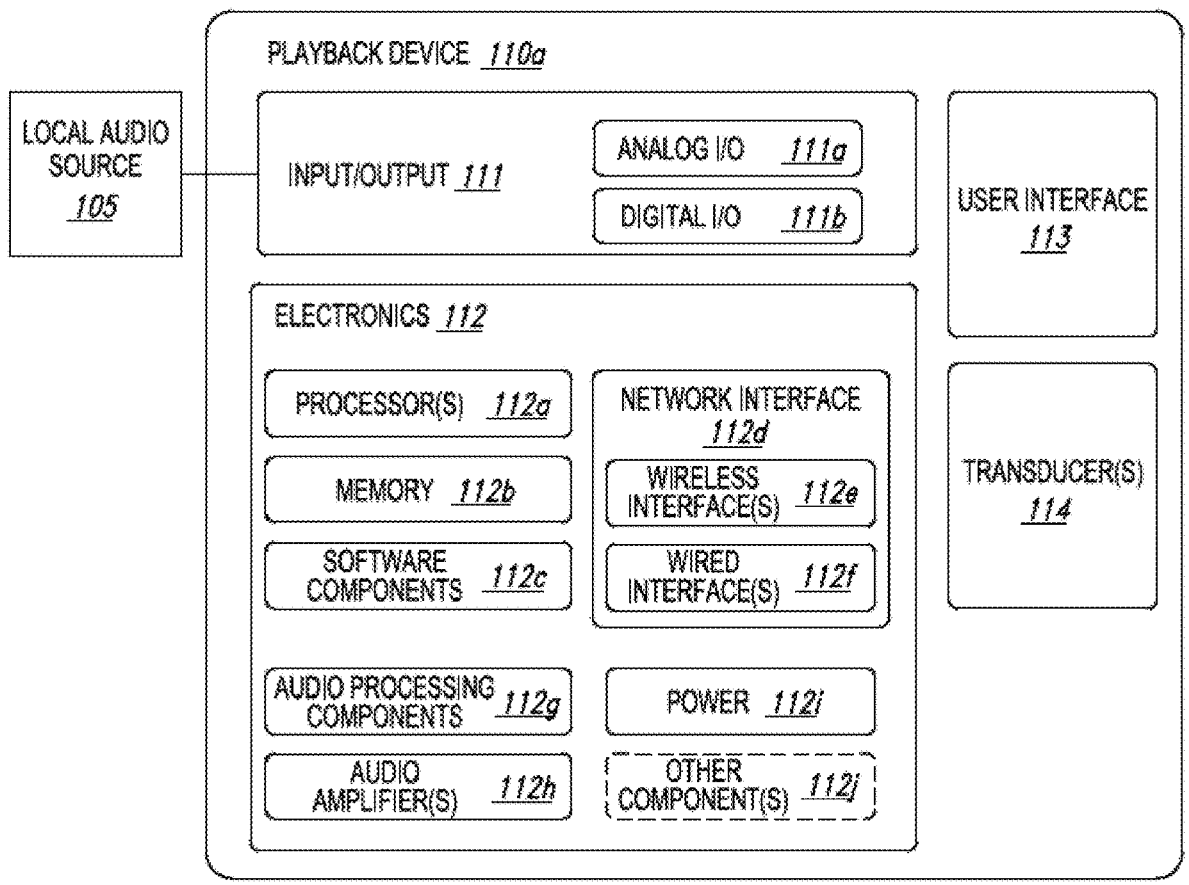
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 132d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
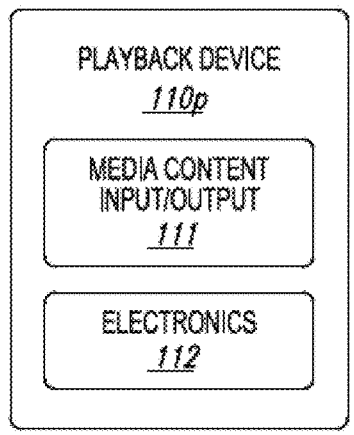
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
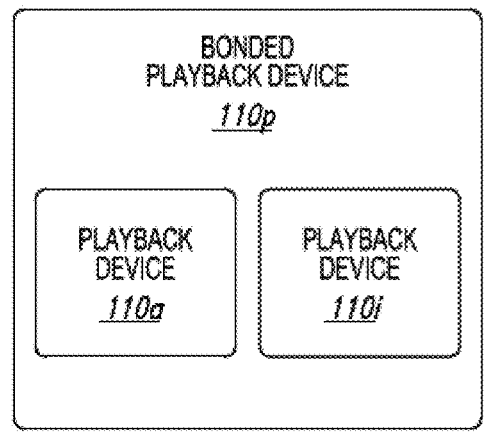
FIG. 1E is a block diagram of a bonded playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

Figures 1F, 1G:
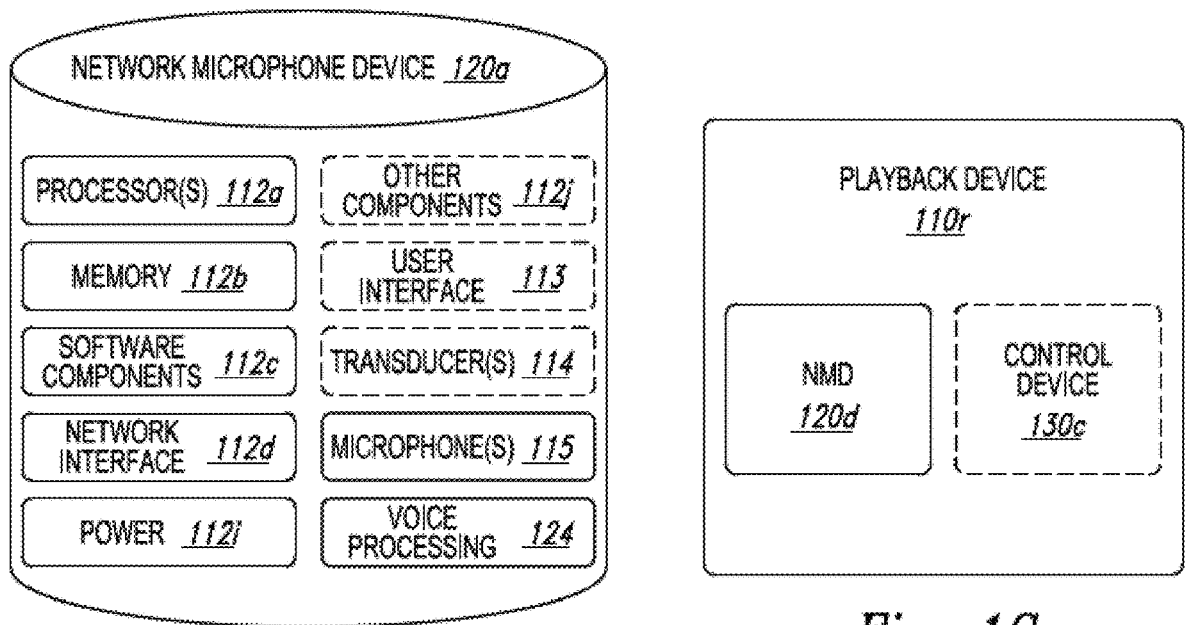
FIG. 1F is a block diagram of a network microphone device.
FIG. 1G is a block diagram of a playback device.

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 112h, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
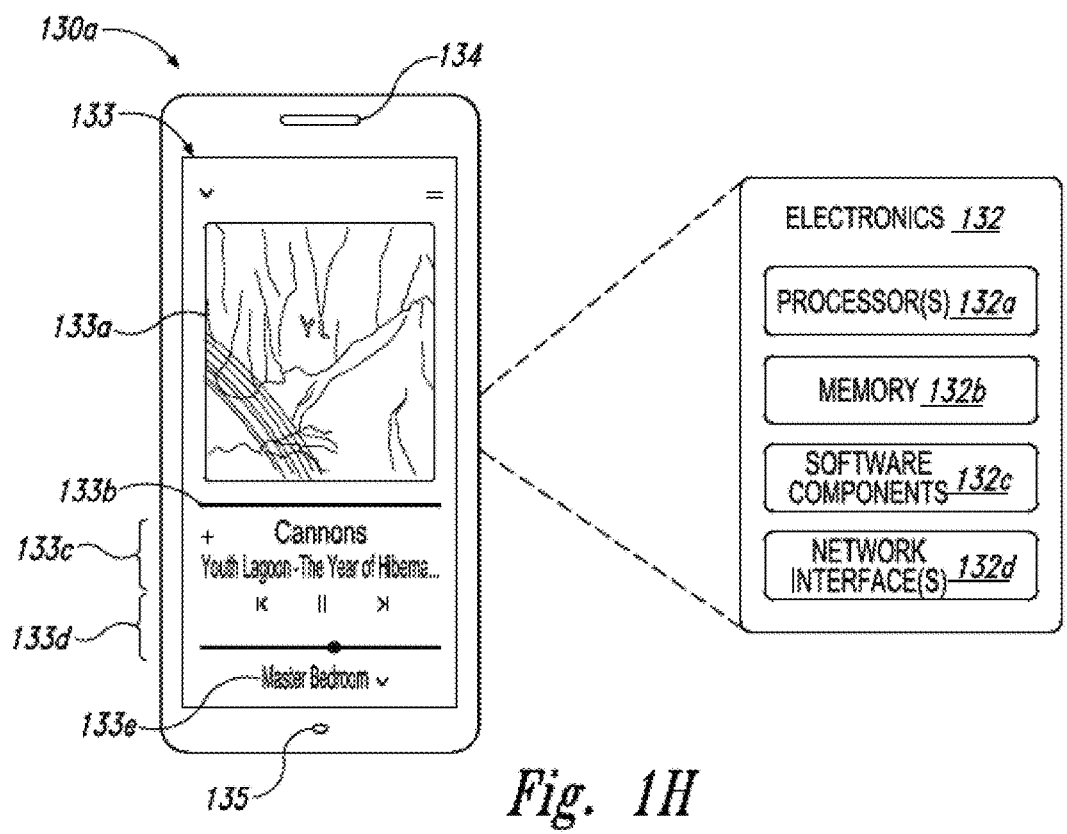
FIG. 1H is a partially schematic diagram of a control device.

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 132b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
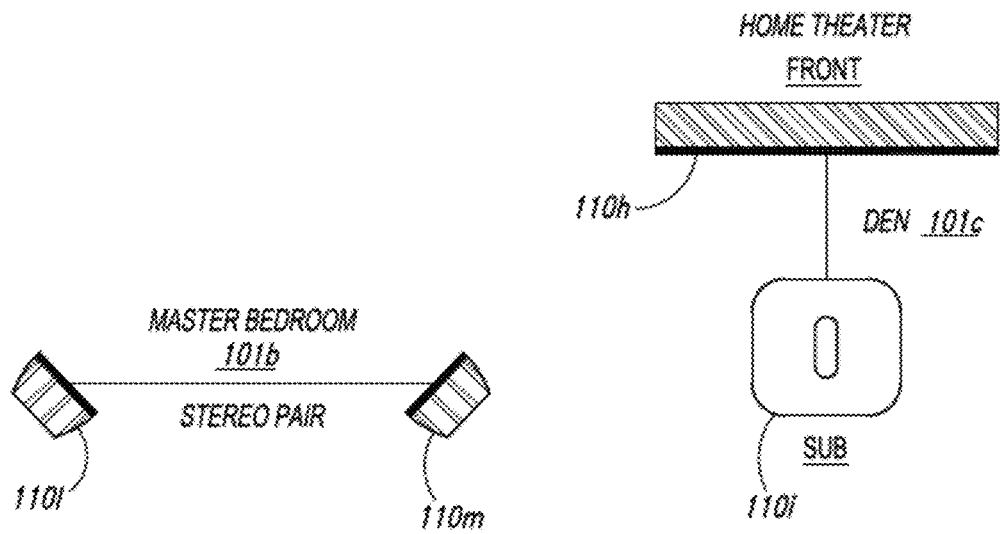
FIGS. 1-I through 1L are schematic diagrams of corresponding media playback system zones.
FIG. 1M is a schematic diagram of media playback system areas.
Figures 1K, 1L:
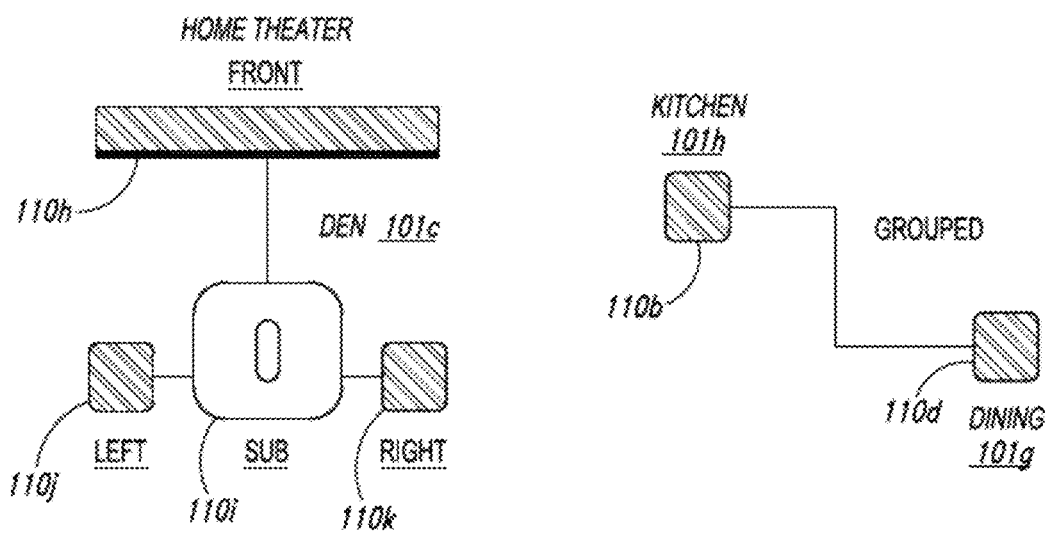
Figure 1M:
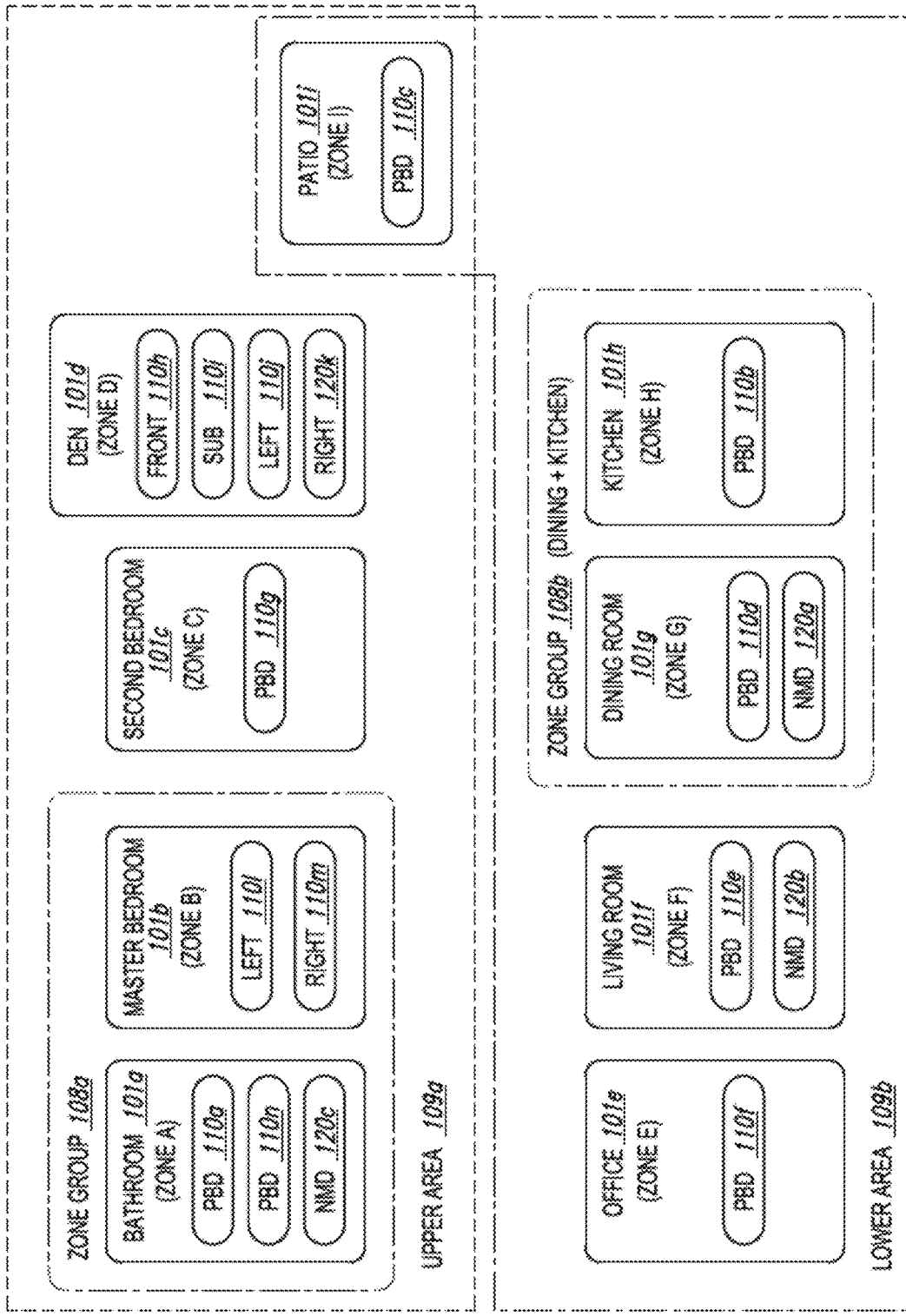

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
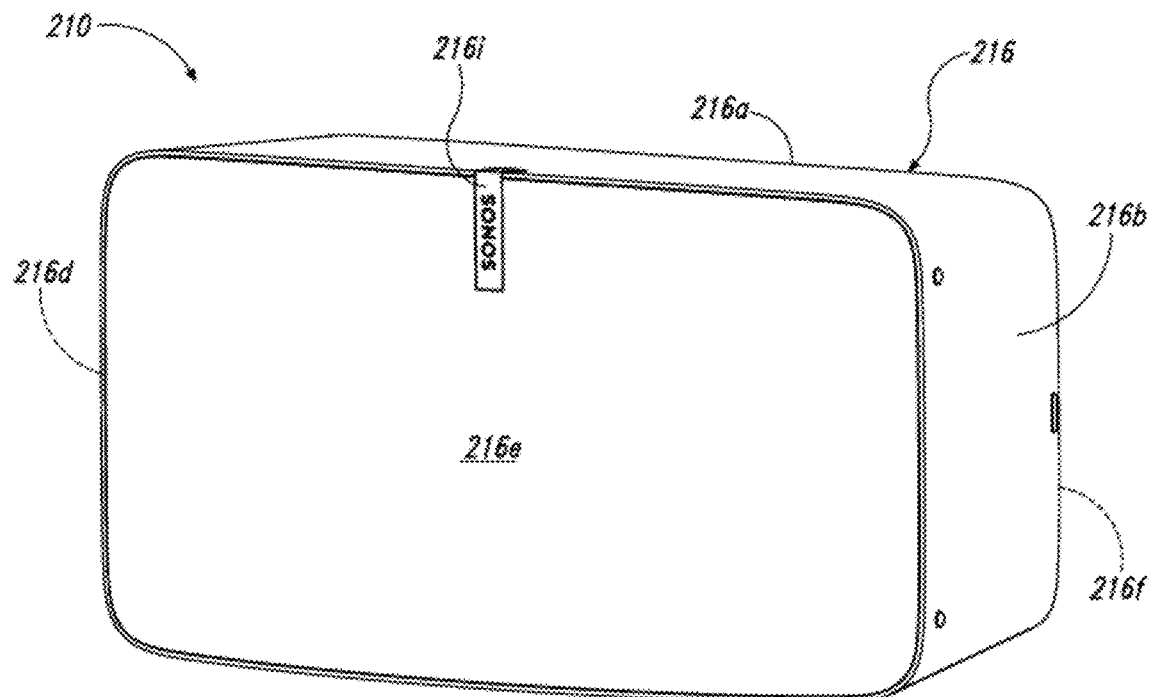
FIG. 2A is a front isometric view of a playback device configured in accordance with aspects of the disclosed technology.
Figure 2B:
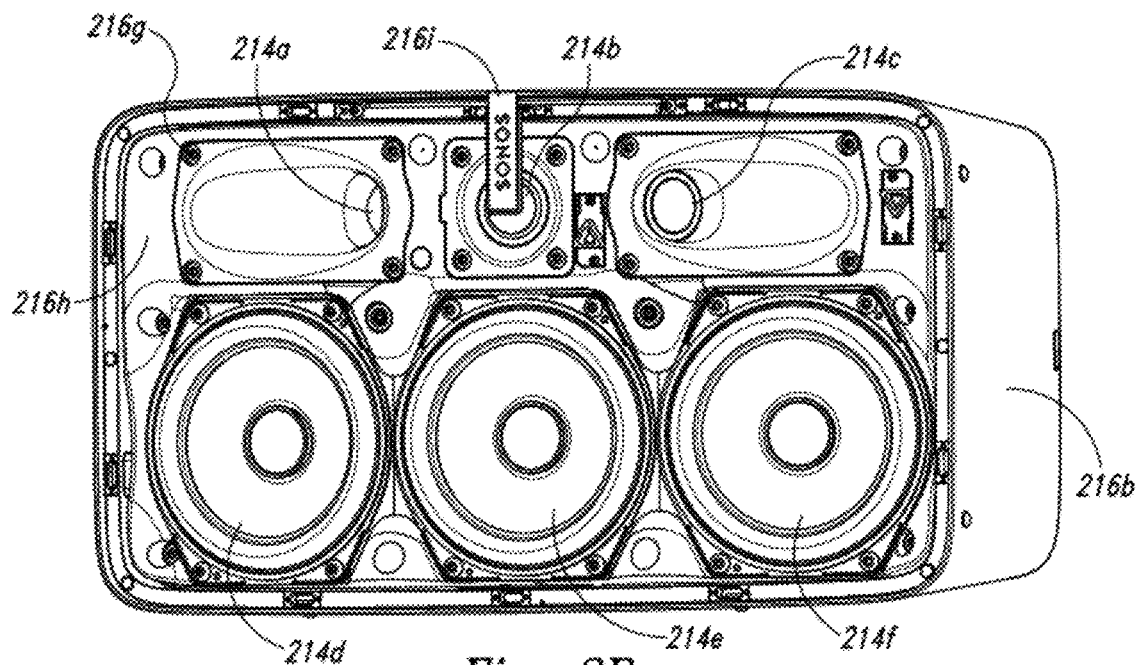
FIG. 2B is a front isometric view of the playback device of FIG. 3A without a grille.
Figure 2C:
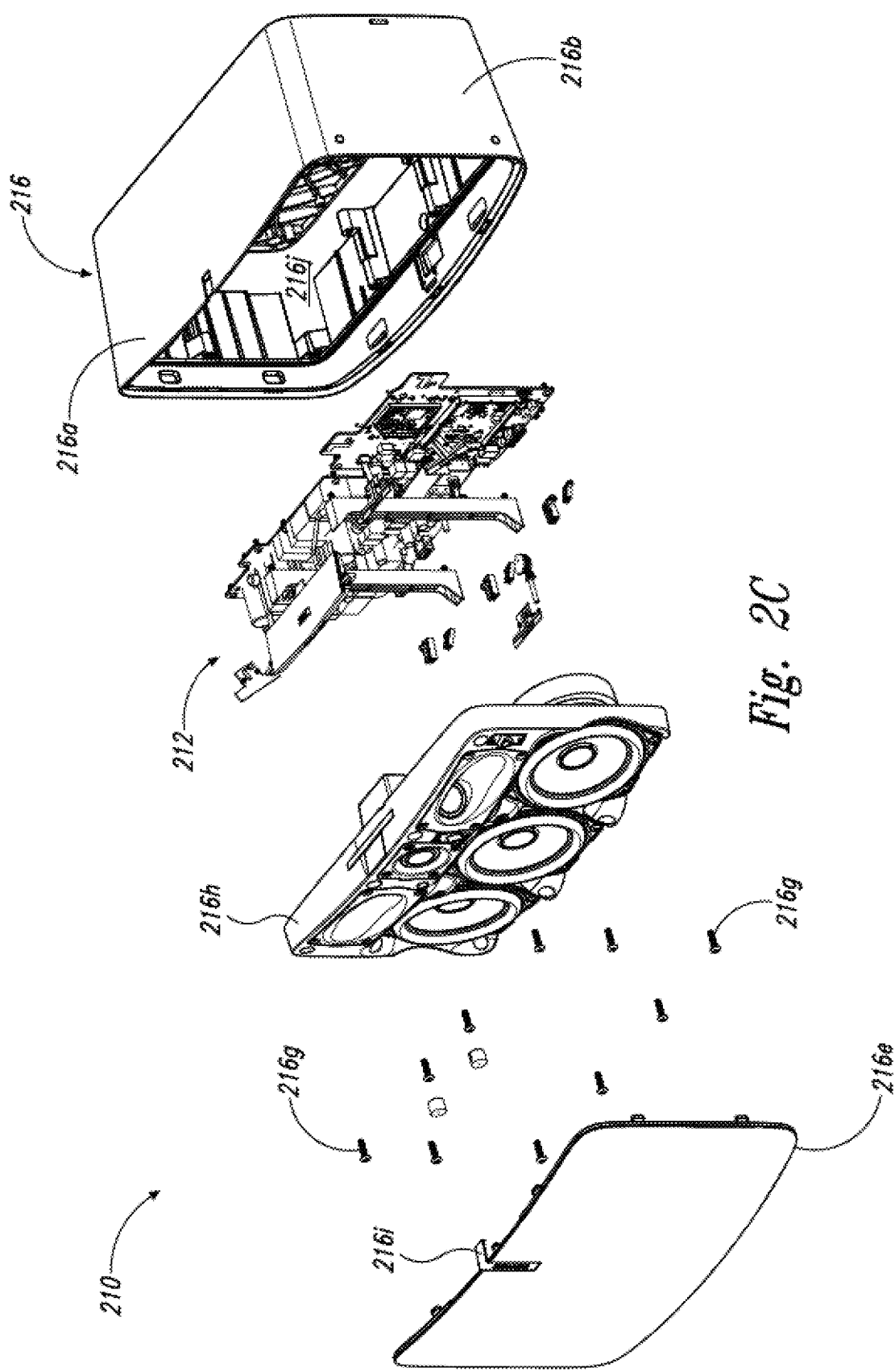
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C.

For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
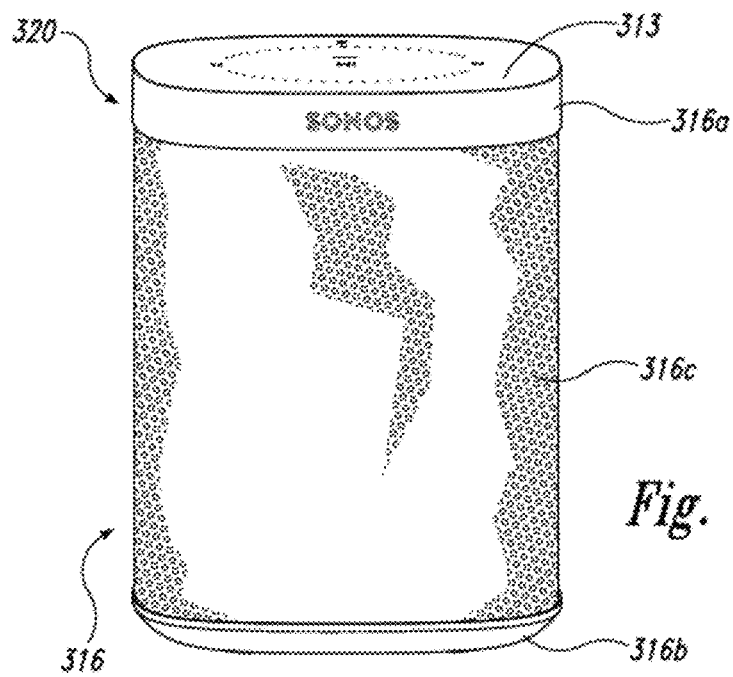
FIG. 3A is a front view of a network microphone device configured in accordance with aspects of the disclosed technology.
Figure 3B:
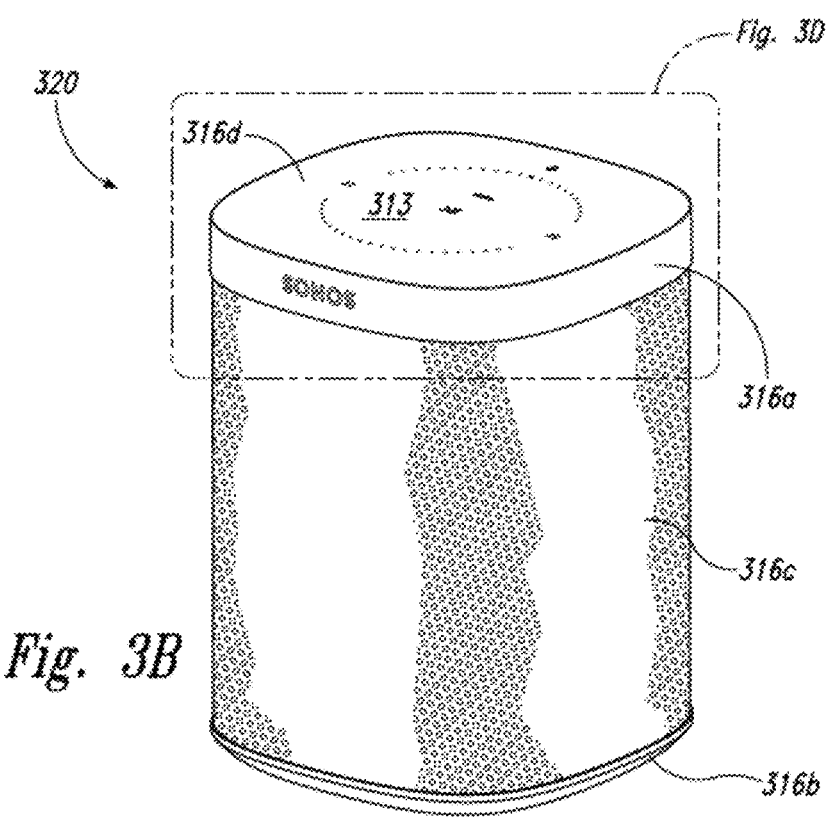
FIG. 3B is a side isometric view of the network microphone device of FIG. 3A.
Figure 3C:
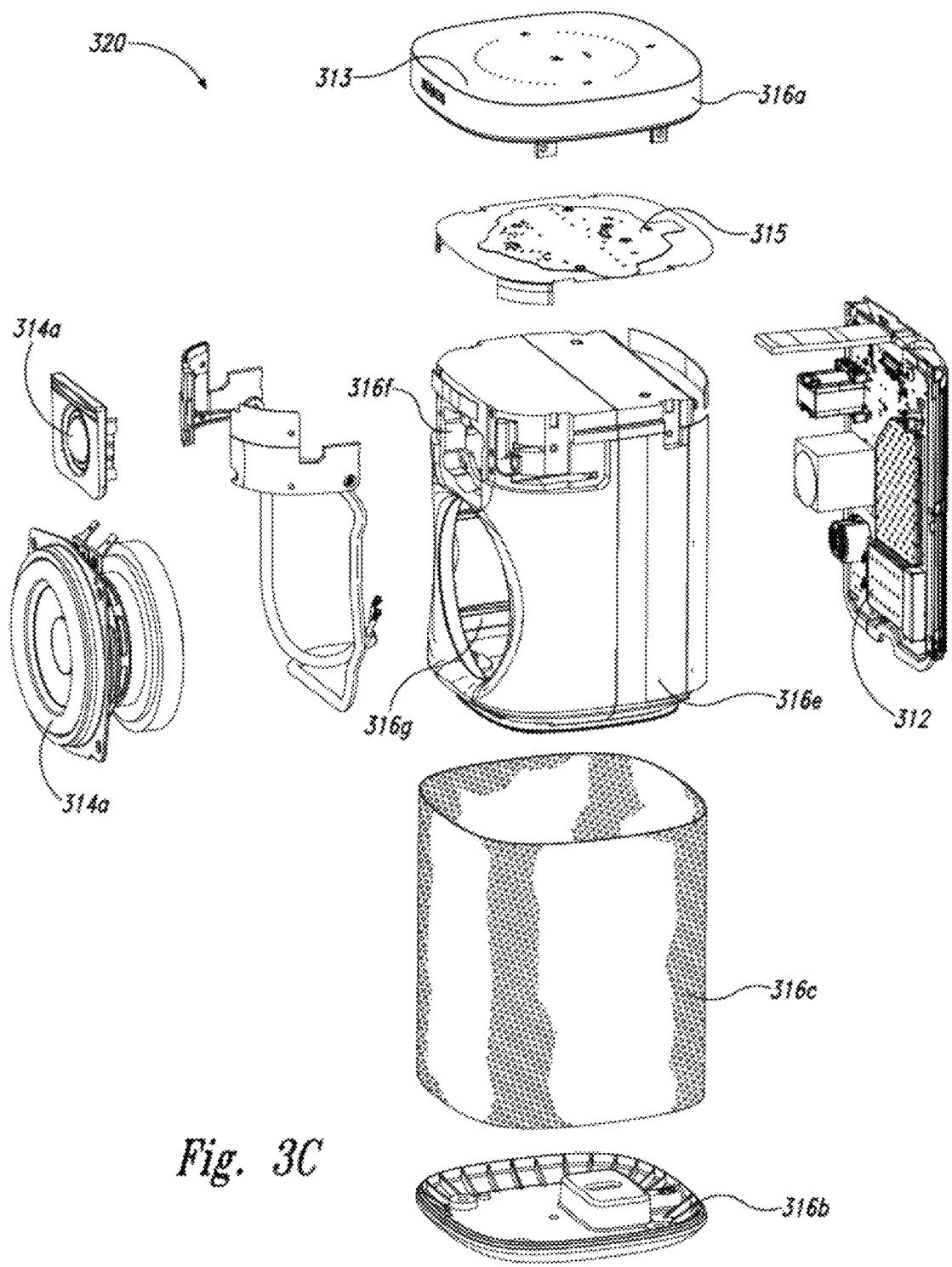
FIG. 3C is an exploded view of the network microphone device of FIGS. 3A and 3B.
Figure 3D:
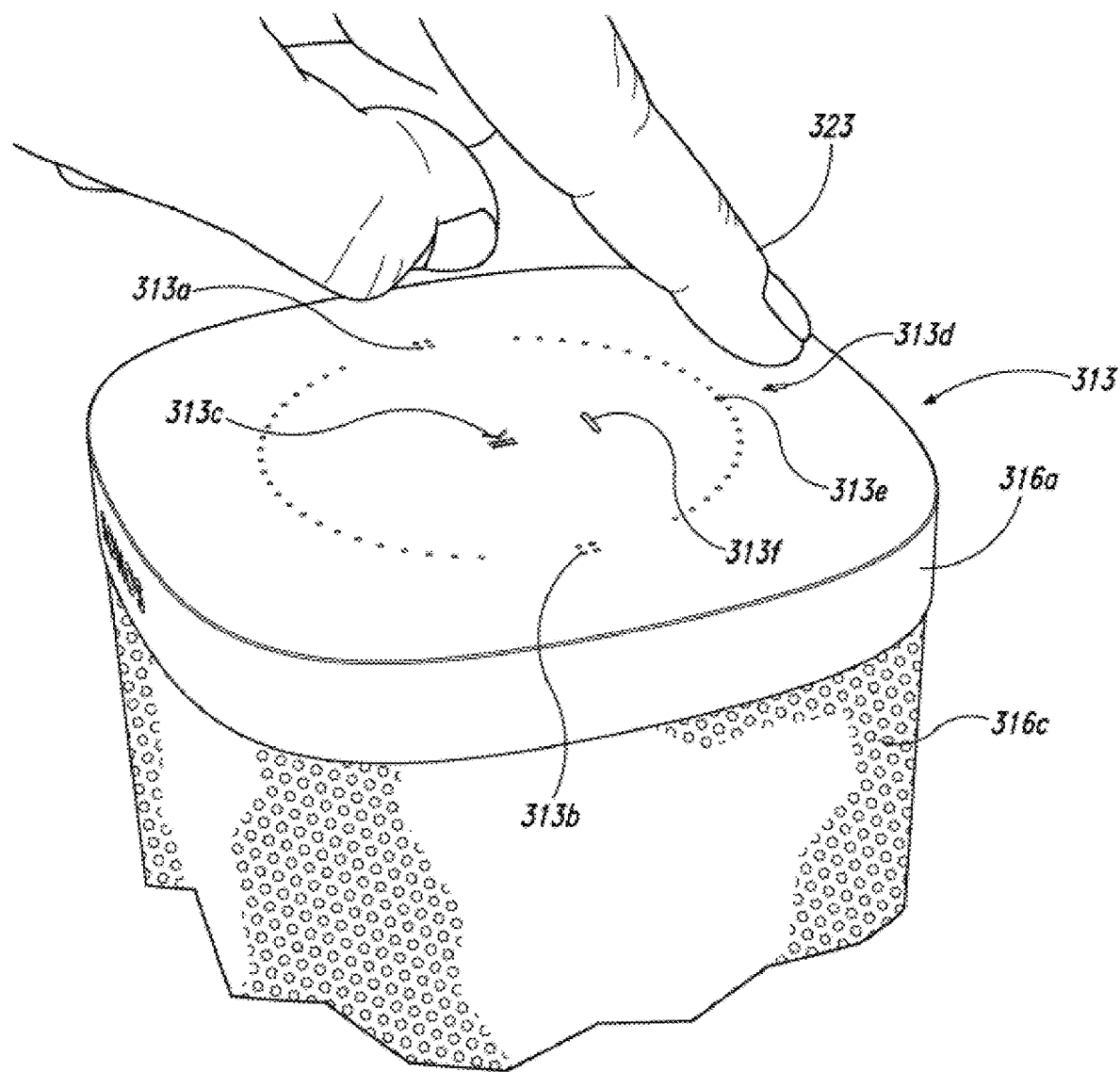
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
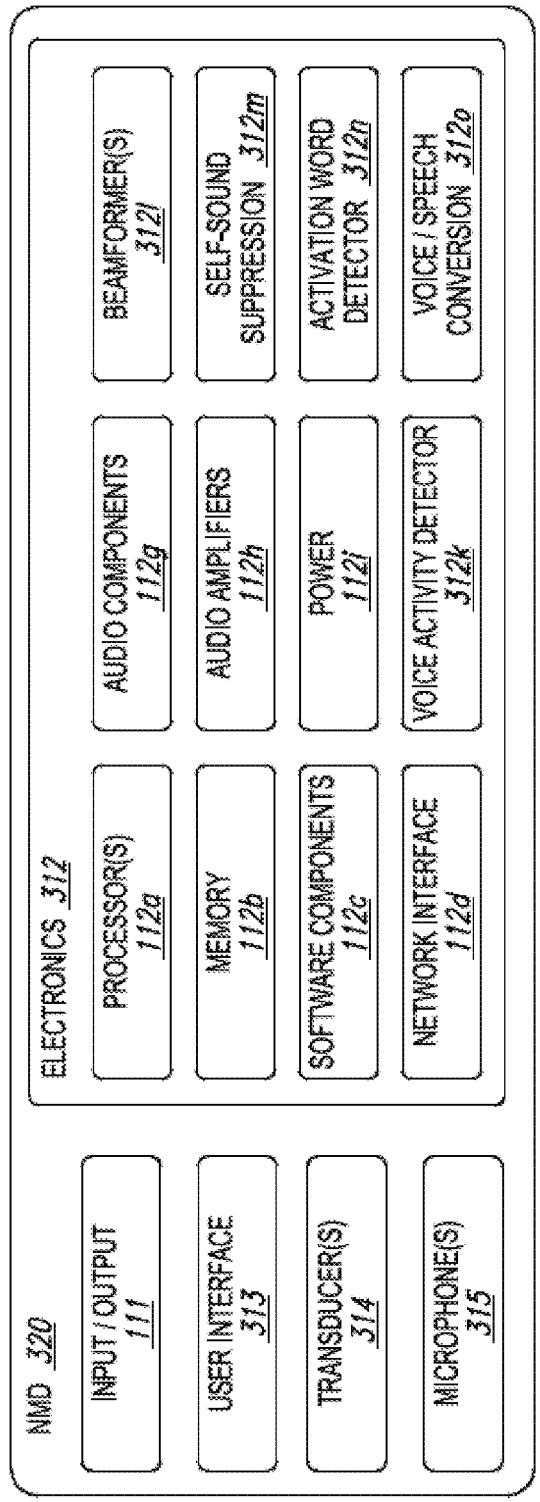
FIG. 3E is a block diagram of the network microphone device of FIGS. 3A-3D.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components, 312*l* and 312*m* respectively, are configured to detect an audio signal and determine aspects of voice input represented in the detected audio signal, such as the direction, amplitude, frequency spectrum, etc. The voice activity detector activity components 312*k* are operably coupled with the beamforming and AEC components, 312*l* and 312*m* respectively, and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
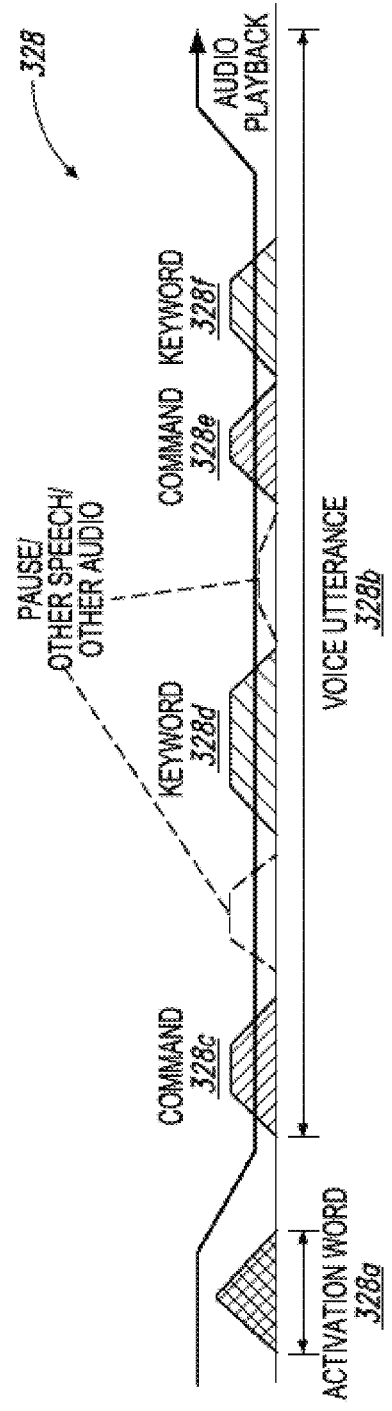
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*0*. In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
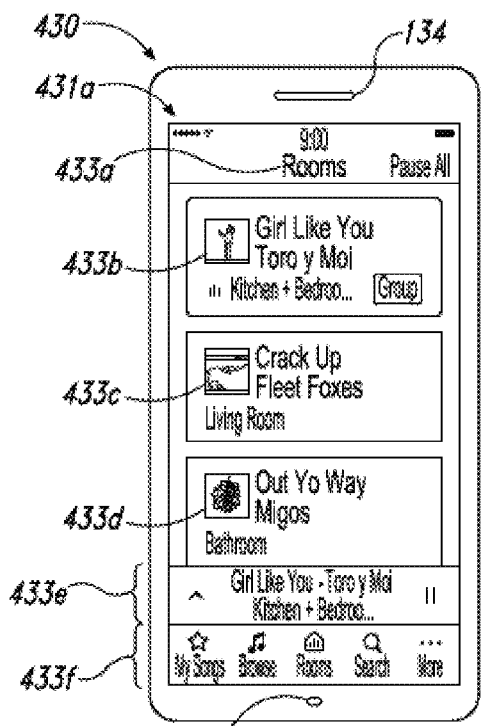
FIGS. 4A-4D are schematic diagrams of a control device in various stages of operation in accordance with aspects of the disclosed technology.
Figure 4B:
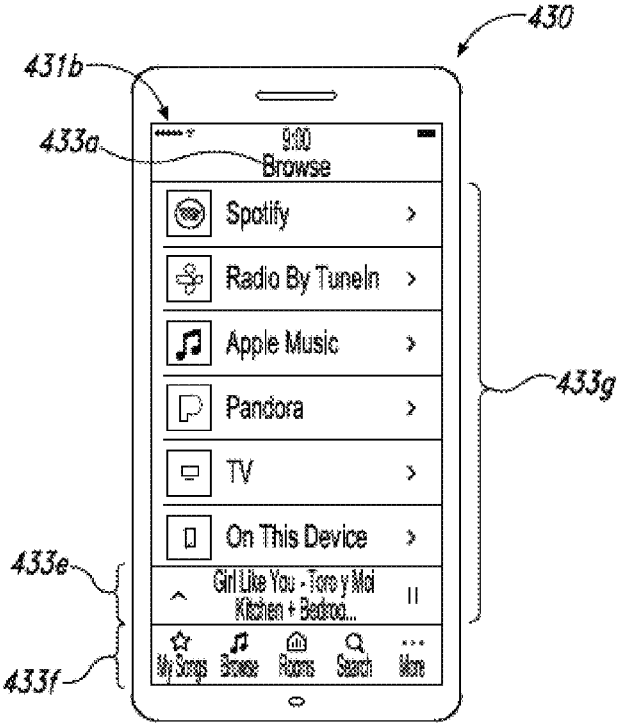
Figure 4C:
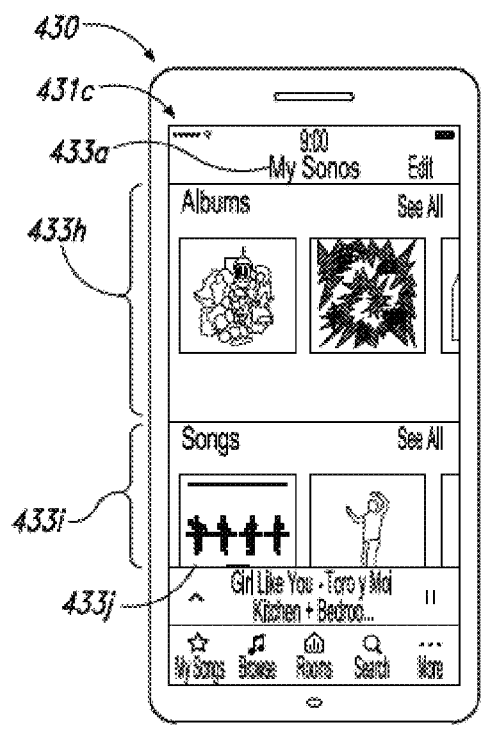
Figure 4D:
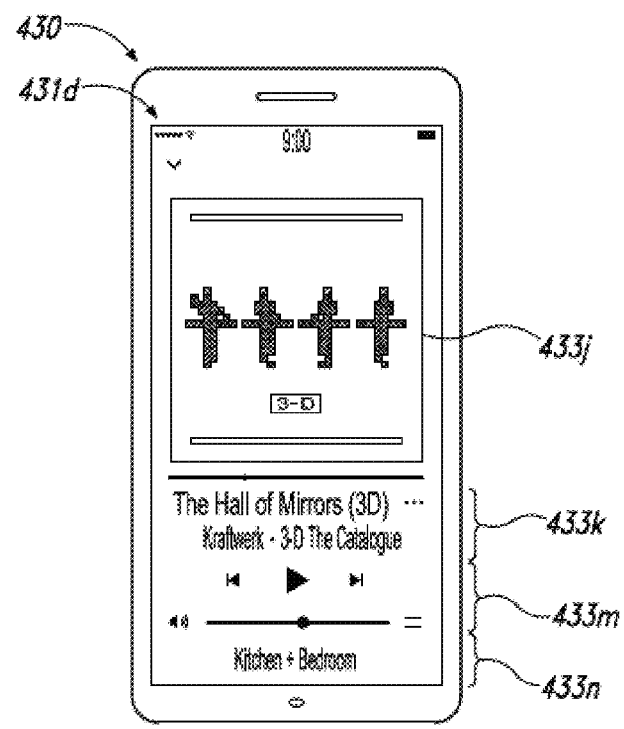

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
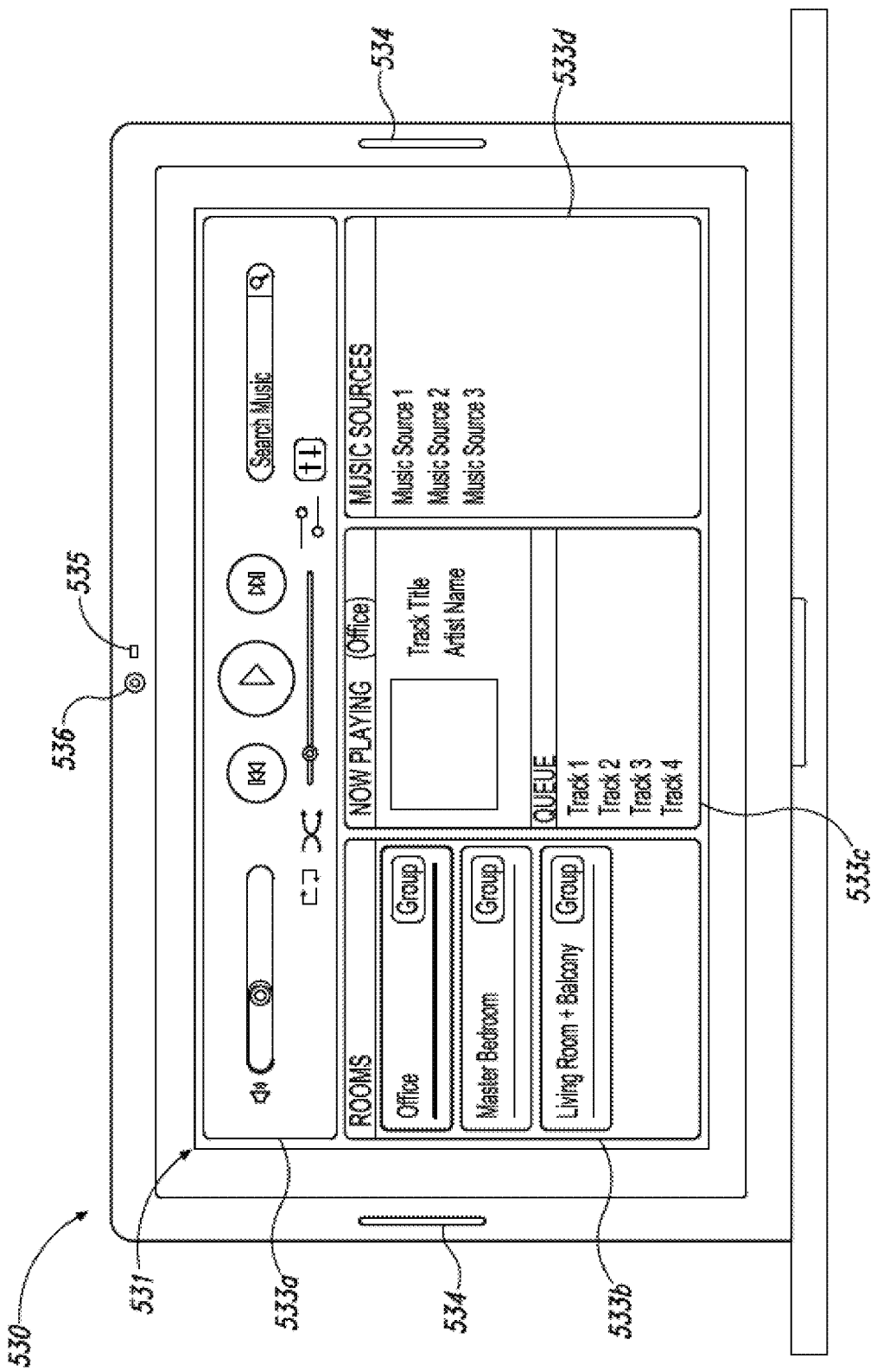
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
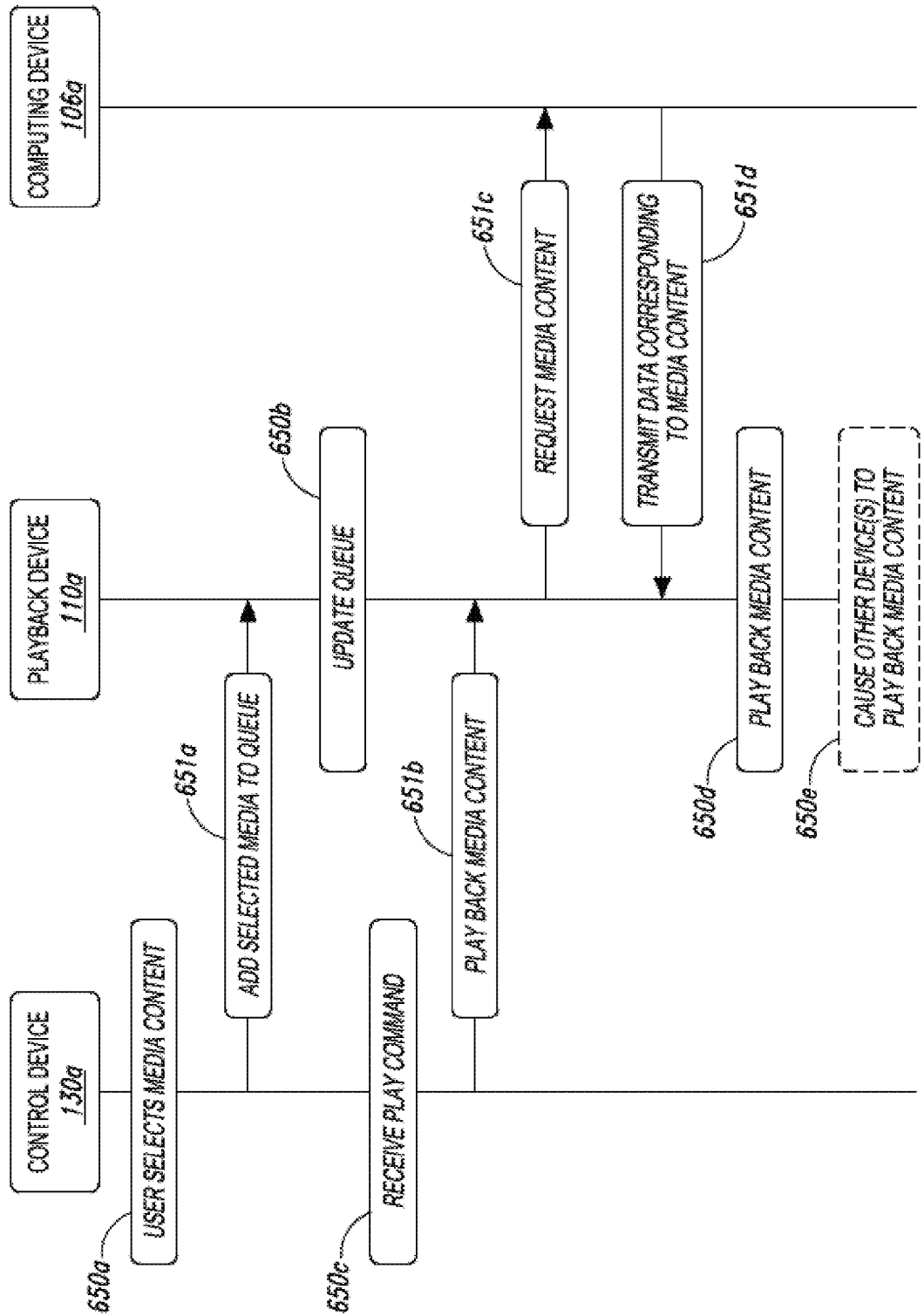
FIG. 6 is a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example Techniques for Dynamic Routing

Figure 7:
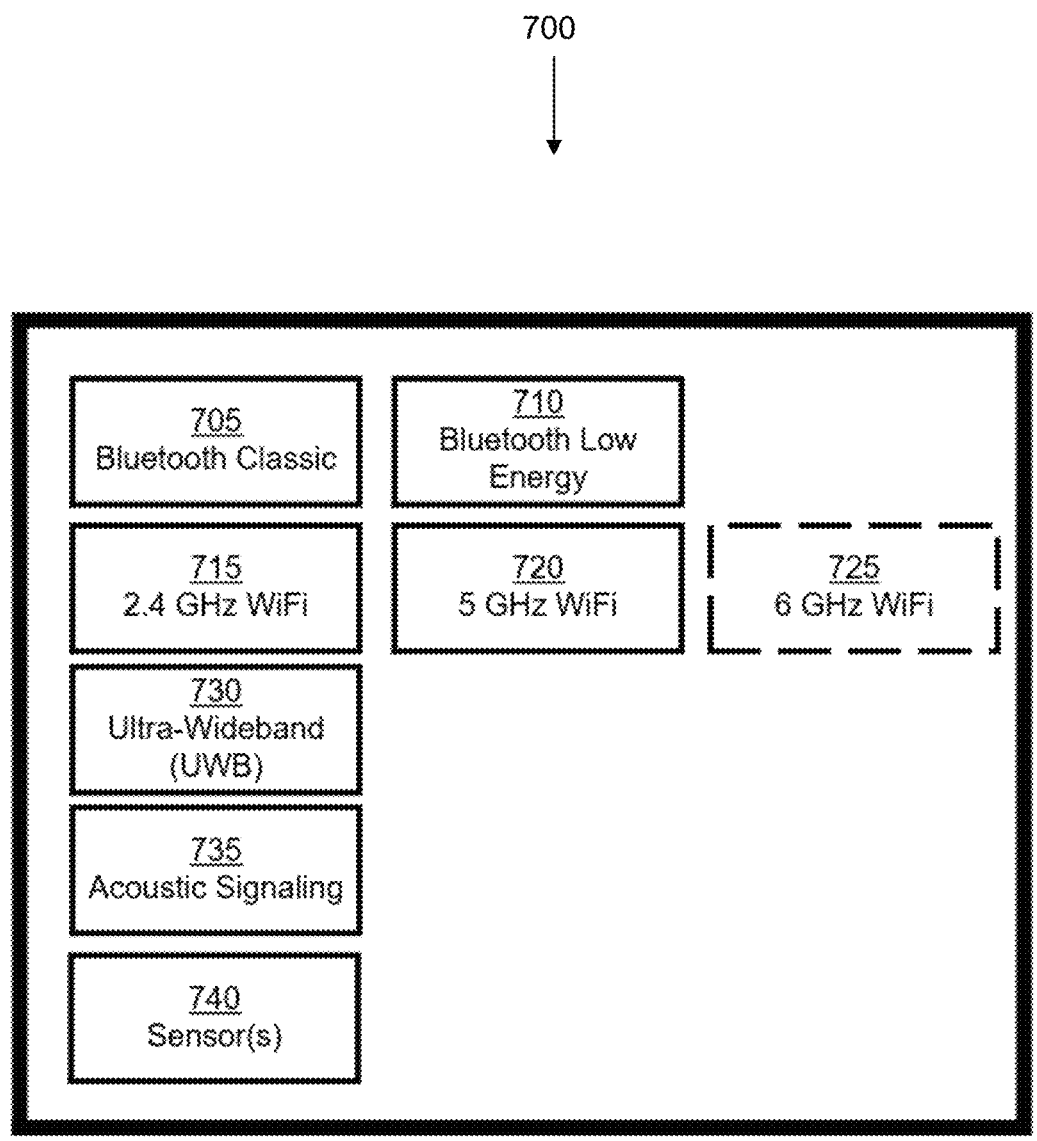
FIG. 7 is a block diagram of a playback device for facilitating context-aware dynamic communication according to an embodiment.

FIG. 7 shows a block diagram of an example of a playback device 700 for facilitating context-aware dynamic communication according to certain embodiments of the technology disclosed herein.

In some embodiments, playback device 700 may include any of the componentry and functionality of playback devices 110a-n. In some embodiments, playback device 700 may incorporate additional componentry and functionality than found in playback devices 110a-n. For example, playback device 700 may include additional mechanisms for facilitating communication between and/or among devices of a media playback system (e.g., media playback system 100). Such communication mechanisms may include, but are not limited to, Bluetooth Classic 705, BLE 710, 2.4 GHz WiFi 715, 5 GHz WiFi, 6 GHz WiFi, UWB 730, Acoustic Signaling 735, infrared communication, and/or other communication mechanisms. In certain embodiments, the communication mechanisms may also include any type of short-range communication componentry (e.g. chips, etc.), long-range communication componentry, any frequency GHz WiFi, Internet of Things (IoT) componentry, transceivers, radio frequency devices, any type of communication mechanism, or a combination thereof.

In some embodiments, Bluetooth Classic 705 may be a communication capability of the playback device 700 that is utilized facilitate communication of data (e.g. audio content and/or other content) with another playback device, controller, NMD, or other device, such as by utilizing a Bluetooth chip or communication module of the playback device 700. For example, Bluetooth Classic 705 may be utilized by the playback device 700 to receive and stream audio from a portable playback device of a media playback system (e.g., media playback system 100). In such a scenario, the playback device 700 may not be directly connected to a WiFi network that the portable playback device is connected to. The portable playback device may then be configured to obtain the audio content (e.g., from one or more cloud servers associated with a streaming service) and stream the received audio content over a Bluetooth Classic network to the playback device 700 and (e.g., simultaneously) over the WiFi network to other playback devices on the WiFi network for synchronous playback of the audio content for all devices receiving the audio content stream. For example, all devices on the WiFi network that receive the audio content stream and the playback device 700, which may not be connected to the WiFi network, may be configured to synchronously play the audio content stream.

In some embodiments, BLE 710 may be a communication capability of the playback device 700 that is utilized to facilitate receipt of control commands from a controller (e.g., control device 130a) to the playback device 700. For example, a controller may receive inputs from a user to cause the playback device 700 to playback audio content. Such inputs may be received by the playback device 700 by utilizing BLE 710. In certain embodiments, streaming of audio content and/or other data to other devices may also be conducted by utilizing BLE 710 of the playback device 700. In some embodiments, BLE 710 may also be utilized for setting up the playback device 700, such as to initiate the operative functionality of the playback device 700 and/or to join the playback device 700 to a media playback system, such as the media playback system 100. In some embodiments, the 2.4 GHz WiFi 715, 5 GHz WiFi 720, and/or 6 GHz WiFi 725 may be utilized to transmit audio content, other content, and/or data from and/or to the playback device 700, such as via a WiFi radio of the playback device 700. For example, the playback device 700 may operate in a first scenario where the playback device connects (e.g., directly connects) to a WiFi access point (AP). In such a first scenario, the playback device may utilize a WiFi radio with the highest capability that still matches the WiFi AP (e.g., use 5 GHz WiFi 720 for a dual-band WiFi AP that supports the 2.4 GHz band and the 5 GHz band). In a second scenario where the playback device is part of bonded zone configured as a home theater system, the playback device 700 may employ the 5 GHz WiFi 720 (or 6 GHz WiFi 725) to communicate audio content (e.g., associated with video content rendered on a display) between the playback devices within the home theater system. Further, the playback device 700 may employ another WiFi communication mechanism (e.g., 2.4 GHz WiFi, Bluetooth, etc.) to facilitate communication with devices outside the home theater system (e.g., another playback device not in the home theater system, a WiFi AP, a controller, etc.).

In some embodiments, UWB 730 may be a communication capability utilized by the playback device 700 for, for example, one or more of: (1) communicating data between devices; (2) facilitating determination of the distance between the playback device 700 and other devices (e.g., playback devices 110a-n, NMDs 120a-c, etc.); and/or (3) facilitating determination of the relative location of the playback device 700 with respect to such other devices. For example, the UWB 730 may be utilized to facilitate discrimination of satellite playback devices in a home theater use-case scenario involving multiple playback devices.

In some embodiments, acoustic signaling 735 may be utilized for (1) facilitating setup flows for the playback device 700 and/or (2) facilitating determination of the relative location of the playback device 700 with respect to such other device. Such acoustic signaling 735 may comprise transmission of any of a variety of acoustic signals including ultrasonic and/or new ultrasonic signals in any of a variety of schemes. For instance, data may be transmitted via acoustic signaling by transmission of near ultrasonic tones at specified frequencies that denote a particular symbol. Examples of such acoustic signaling techniques are described in more detail in PCT Publication No. WO/2019/122910, published on Jun. 27, 2019, titled "A Method and System for Improved Acoustic Transmission of Data," which is incorporated herein by reference in its entirety. Notably, in some embodiments, the playback device 700 may be configured to support other communication capabilities in addition to the communication capabilities specifically described herein.

In certain embodiments, the playback device 700 may also include any number of sensors 740, which may be utilized to measure sensor data associated with the operation of the playback device 700, movements of the playback device 700, conditions affecting the playback device 700, conditions associated with an environment that the playback device 700 is located in, conditions affecting a user of the playback device 700, and/or other sensor data. In certain embodiments, the sensors 740 may include, but are not limited to, accelerometers, gyroscopes, motion sensors, humidity sensors, pressure sensors, temperature sensors, proximity sensors, infrared sensors, light sensors, GPS or location sensors, acoustic sensors, touch sensors, tilt sensors, any types of sensors, or a combination thereof. Sensor data measured by the sensors 740 may be provided to one or more devices of a media playback system (e.g. the media playback system 100) that the playback device 700 is connected to.

Figure 8:
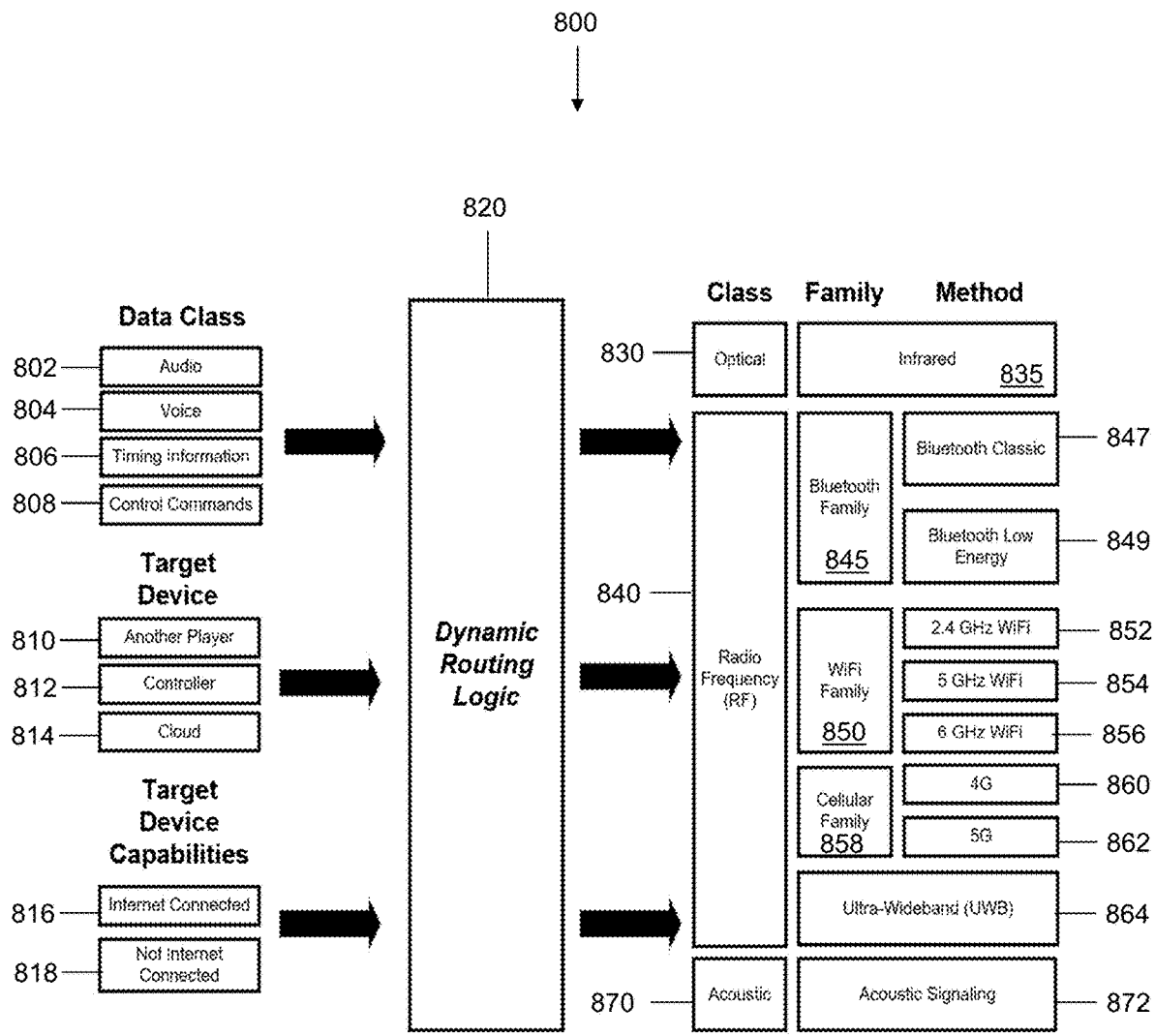
FIG. 8 is a block diagram of an architecture depicting exemplary contextual information utilized to facilitate context-aware dynamic communication according to exemplary embodiments.

FIG. 8 provides a block diagram of an architecture 800 and accompanying process flow depicting exemplary contextual and other information utilized to facilitate context-aware dynamic communication according to exemplary embodiments. For example, the architecture 800 depicts that the data class associated with data to be communicated or received by a playback device 700 may be examined by the playback device 700 (and/or any component(s) of media playback system 100 or other device) to determine the context associated with how the data should be communicated. The types of data fitting within the data class may include, but are not limited to, audio data 802 (or content), voice data 804, timing information 806, and/or control commands 808. In some embodiments, information indicating the type of target device (or system) that the playback device 700 is to communicate data to or from may also be utilized to determine the relevant context. For example, the target device may be another playback device 810 (e.g., playback devices 110*a-n*), a controller 812 (e.g., controller 130*a*), a cloud device 814 or system, and/or any other target device (e.g., any device capable of joining the media playback system 100).

In some embodiments, in addition to factoring in the type of target device that the playback device will communicate with, the target device's capabilities may also be utilized to determine the relevant context for facilitating optimal communication between the target device and the playback device 700. For example, the target device capabilities may indicate whether the target device is internet connected 816 or not internet connected 818. Of course, other target device capabilities may also be analyzed and factored into determining the relevant context as well. For example, the processing capabilities, the memory capabilities, the sensor capabilities, and/or any other capabilities may be analyzed and determined to determine the relevant context. In some embodiments, the playback device 700 and/or the media playback system 100 (or other devices connectable to the playback device 700 and/or the media playback system 100) may include dynamic routing logic 820, which may be utilized to determine how to route or communicate data based on the determined context associated with data, devices, and/or systems participating in the communication of the data. In certain embodiments, the dynamic routing logic 820 may be implanted via hardware, software, or a combination of hardware and software.

In some embodiments, the classes of communication capabilities, the family of communication capabilities, and/or the methodologies of the communication capabilities may also be analyzed and factored into account when determining the context. For example, classes of communication capabilities may include, but are not limited to, optical communication capabilities 830, radio frequency communication capabilities 840, acoustic communication capabilities 870, and/or other classes of communication capabilities. In some embodiments, the optical communication capabilities 830 may include infrared communication family and methods 835, which may be utilized to communicate data using infrared communication. In some embodiments, the infrared family/method 835 may include Infrared Data Association (IrDA). In some embodiments, the class of radio frequency capabilities 840 may include a plurality of communication families, such as, but not limited to, short-range wireless families (e.g. Bluetooth family 845), WiFi family 850, the cellular family 858, the UWB family/method 864 and the like. The Bluetooth family 845 may include one or more communication methods within the family. For example, the methods in the Bluetooth family 845 may include Bluetooth Classic 847 and BLE 849. In some embodiments, the WiFi family 850 may include multiple different communication methods including, but not limited to, 2.4 GHz WiFi 852, 5 GHz WiFi 854, 6 GHz WiFi 856, and other frequency WiFi. The cellular family 858 may include multiple communication methods as well. For example, the cellular family 858 may include 4G 860, 5G 862, and/or other communication methods classified under the cellular family 858. In some embodiments, the acoustic communication capabilities 870 may include acoustic signaling family/method 872.

Figure 9:
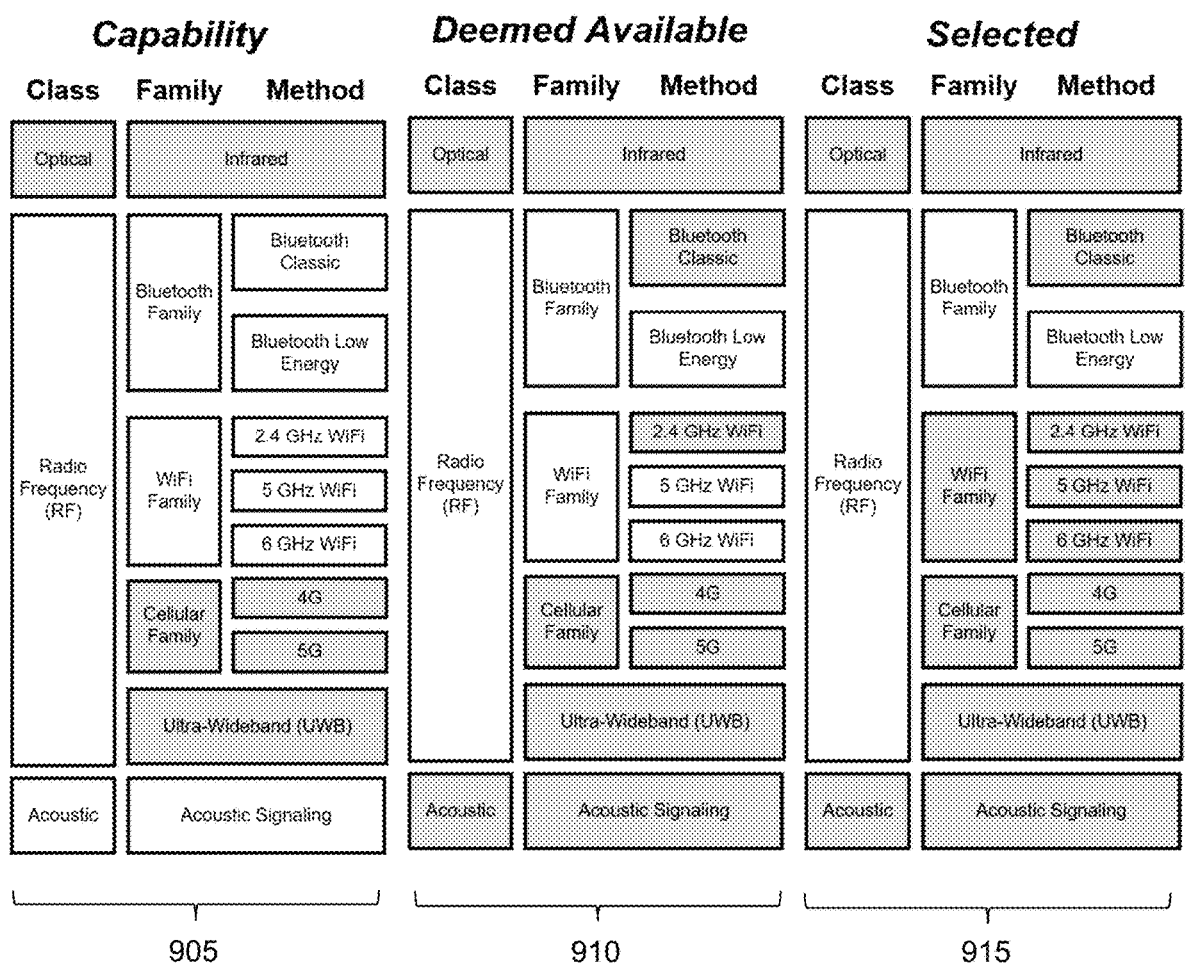
FIG. 9 is a block diagram illustrating a graphical representation of a communication method selection process according to exemplary embodiments.

Based on at least the foregoing information, a playback device 700, a target device, and/or a media playback system 100 may utilize the dynamic routing logic 820 to determine which communication capability is optimal, the best, or preferred for communicating a specific type of data between a playback device and one or more target devices. FIG. 9 illustrates a graphical representation 900 of a communication method selection process that the dynamic routing logic 820 may utilize according to exemplary embodiments. The graphical representation 900 depicts various stages 905, 910, 915 for a playback device 700, a target device, and/or a media playback system 100 to determine the optimal communication (or highest ranked) method for communicating data between a playback device 700 and a target device. At stage 905, the playback device 700 (or other device or system) supporting certain communication capabilities may determine the communication capabilities of a target device, which may be another playback device 110*a-n*. In certain embodiments, stage 905 may begin after the playback device 700 has identified the type of data that is to be communicated to the target device. During stage 905, the playback device 700 (or other device or system) may identify which communication capabilities of the playback device 700 overlap with the communication capabilities of the target device. For example, in FIG. 9, the playback device 700 may have identified that playback device 700 and a target device have two classes of communication that overlap, namely the class of radio frequency capabilities 840 and the class of acoustic capabilities 870. In this case, one of or both the playback device 700 and the target device may not be capable of optical communication capabilities 830.

Once the playback device 700 determines which classes of communication capabilities overlap between the playback device 700 and the target device, the playback device 700 may then determine which families within the classes of communication capabilities that the playback device 700 and the target device have in common (i.e. overlap). For example, in FIG. 9, the playback device 700 may determine that of the radio frequency capabilities 840 that only the Bluetooth family 845 and WiFi family 850 of communication capabilities overlap and that one or both of playback device 700 and target device are unable to communicate via the cellular family 858 and UWB family 864 of communication capabilities. In FIG. 9, the playback device 700 may determine that the acoustic signaling family/method 872 communication capabilities overlap. If a particular family of communication capabilities overlap between the playback device 700 and the target device, the playback device 700 may then further determine which specific communication methods within the communication families of overlapping communication capabilities overlap. For example, in FIG. 9, the playback device 700 may determine that Bluetooth Classic 847 and BLE 849 communication methods of the Bluetooth family 845 and the 2.4 GHz 852, 5 GHz 854, and 6 GHz 856 communication methods of the WiFi family 850 overlap with the target device. In certain embodiments, a table may be stored on the playback device 700, the target device, a media playback system 100, and/or on a network that indicates the overlap in communication capabilities between the playback device 700 and the target device. By storing such information in a table, the playback device 700 may automatically ascertain the communication capabilities of the target device on a future occasion for communicating data to the target device.

Once stage 905 is completed, the graphical representation 900 illustrates that the process flow may proceed to stage 910, which may involve determining which subset of communication methods within the respective overlapping families and classes are available for communication for the playback device 700 and the target device. For example, in FIG. 9, the playback device 700 may determine that even though the Bluetooth Classic 847 method of communication overlaps with the target device that the Bluetooth Classic 847 method of communication is unavailable. For example, the playback device 700 may be configured to determine that the Bluetooth Classic 847 method of communication is unavailable based on the Bluetooth Classic 847 method of communication already being used by the playback device 700 and/or target device to transmit or receive data. As another example, the playback device 700 may be configured to determine that the Bluetooth Classic 847 method of communication is unavailable based on the Bluetooth Classic 847 method of communication being disabled by a user of the playback device 700 and/or target device. As a further example, the Bluetooth Classic 847 method of communication may be determined to be unavailable if a threshold amount of data traffic is being transmitted or received via Bluetooth Classic 847 by the playback device 700, the target device, or both.

In some embodiments, the playback device 700 (or target device or other device) may be configured to continue examining remaining communication capabilities in the set of overlapping communication capabilities to determine which communication capabilities are available for communication. In FIG. 9, the playback device 700 may be configured to determine that BLE 849 is an available communication capability. For example, the playback device 700 may determine availability of the BLE 849 communication capability based on the BLE 849 communication capability not being used, based on the BLE 849 communication capability being used to transmit or receive less than a threshold amount of data traffic, based on a preference for the BLE 849 communication capability over other communication capabilities, based on sensor data (e.g. if an accelerometer of the playback device 700 or target device indicates that the playback device 700 and/or target device is not moving outside the range for effective BLE 849 connectivity), based on other factors, or a combination thereof.

The playback device 700 may proceed with examination of the WiFi family 850 of overlapping communication capabilities to determine which, if any, of the WiFi communication capabilities are available. For example, in FIG. 9, the playback device 700 and/or target device may determine that 2.4 GHz WiFi 852 is not available because the communication capability is being used by the playback device 700 and/or target device to transmit or receive content already. On the other hand, the playback device 700 and/or target device may determine that 5 GHz WiFi 854 and 6 GHz WiFi 856 are available because the communication capabilities are not being used or because less than a threshold amount of communication resources are being used for each communication capability.

The playback device 700 may proceed to determine that the cellular family 858 is unavailable for communication and that the acoustic class 870 of communication capabilities are similarly unavailable. For example, the playback device 700 may determine that the acoustic class 870 of communication capabilities is not available because sensor data associated with the playback device 700 and/or the target device indicates that the playback device 700 and/or target device are moving. Acoustic signaling may not work well when the playback device 700 and/or target device are moving (e.g. due to the doppler effect that may complicate the reception of acoustic signals). Accordingly, when a sensor (e.g. an accelerometer) of the playback device 700 and/or target device indicates that either or both devices are moving, the acoustic signaling 870 class of communication capabilities may be deemed unavailable despite the playback device 700 and/or target device being capable of using acoustic signaling to communicate with each other. As another example, acoustic signals that may be utilized with the acoustic signaling 870 class of communication capabilities may not be suited for transmission through walls. Accordingly, if the playback device 700 and/or target device are not sufficiently close to each other (e.g. within the same room), acoustic signaling may be deemed unavailable since the target device is out of range for effective acoustic signaling.

As a further example, a communication capability may be deemed unavailable when a particular function is being performed. For example, a playback device, such as a soundbar, functioning as a primary device for a number of satellite playback devices in a group of playback devices, may utilize the 5 GHz WiFi 854 to communication audio data. Accordingly, in such a scenario, the 5 GHz WiFi 854 may be deemed unavailable or busy in this state to avoid disrupting such high-bandwidth and high-priority transmissions of audio data. Notably, stage 910 may be continued until all available communication capabilities from the set of overlapping communication capabilities are determined.

Once the available communication capabilities are determined at stage 910, the graphical representation 900 illustrates that the process flow may proceed to stage 915, which may involve determining the best available communication capability option, highest ranked communication capability option, and/or the optimal communication capability option for communicating data between the playback device 700 and the target device. In some embodiments, the best available communication capability option may be the communication capability that is best suited for transmission for the particular data type associated with the data to be transmitted between the playback device 700 and the target device. For example, the playback device 700 and/or target device may analyze the data to be communicated to determine its data type. In FIG. 9, for example, the data to be communicated may be a control command or timing information associated with audio content. Based on either of these data types, the playback device 700 may determine that BLE 849 is the best available communication capability option, the highest ranked option, and/or the optimal communication capability for transmitting the control command or timing information associated with the audio content. The playback device 700 and/or target device may then select BLE 849 as the best available communication capability and may initiate transfer of the data between the playback device 700 and the target device.

In certain embodiments, the determination regarding the best available communication capability may be facilitated by defining a hierarchy for each class of data that may be transmitted between a playback device 700 and target device. For example, for a given class of data first, second, third, fourth, etc. options in terms of priority may be established. Additionally, in some embodiments, based on the class of data and/or the characteristics associated with the data to be communicated, the priority (or rank) of a particular communication capability may be adjusted accordingly. An example hierarchy is provided below in Table 1.

TABLE 1

| Data Class | Characteristics | First Tier Options | Second Tier Options |
|---|---|---|---|
| Non-Latency Sensitive Audio | Large, not latency sensitive | WiFi/Cellular | Else |
| Latency Sensitive Audio | Large, latency sensitive | 5/6 GHz WiFi | Else |
| Timing Information | Small data, sensitive to changes in latency (e.g., changes in network conditions) | Bluetooth, UWB, Acoustic Signaling, Optical | Else |
| Control Commands | Small data, occasionally occur in rapid succession | | Any |
| Voice Data | Large data and not very latency sensitive | WiFi/Cellular | Else |

Notably, Table 1 only presents an exemplary defined hierarchy for use in determining the best available communication capability. Any number of columns and/or rows may be utilized. Nevertheless, in Table 1, the hierarchy may specify the data class for data in a first column, characteristics associated with the data in a second column, first tier communication capability options in a third column, and second tier communication capability options in a fourth column. Of course, any number of tiers of options for communications capabilities may be added to Table 1 as well.

The data class may include information identifying the data type associated with data to be communicated between the playback device 700 and the target device. For example, in Table 1, exemplary data classes may include, but are not limited to, non-latency sensitive audio data, latency-sensitive audio data, timing information, control commands, and voice data. The characteristics column may include information identifying information defining one or more characteristics for each of the data classes. For example, non-latency sensitive audio data may have typical characteristics indicating that such data is typically large (e.g. of a certain size or greater), but not latency sensitive (e.g., does not need to be rendered within a certain period of time to maintain synchrony with another device such as a display in a television or smartphone). On the other hand, latency-sensitive audio data may have typical characteristics indicating that such data is typically large, but is latency sensitive (e.g. the latency for the audio content needs to be a threshold latency to ensure that audio content is played at the appropriate time in conjunction with associated visual content). Timing information may have typical characteristics indicating that such data is typically small data (e.g. at or below a threshold size) that is also sensitive to changes in latency (e.g. changes in network conditions).

Control commands (e.g. commands for controlling audio content or functionality of the playback device 700 and/or target device) may have typical characteristics indicating that data associated with such commands are typically small in size (e.g. at or below a threshold size). Additionally, control commands may have the characteristic that such commands typically occur in rapid succession within a given period of time. Furthermore, voice data may have typical characteristics of being associated with large data (e.g. at or above a threshold size) and may not be particularly latency sensitive. In some embodiments, the typical latency sensitivity may be indicated with respect to relating to a threshold value or threshold range of values.

In some embodiments, for each data class, tiers of options may be specified to indicate order of preference for selecting of communication capabilities for communicating data. For example, in Table 1, two tiers of options for communication capabilities are shown for each data class. Notably, however, while two tiers of options are illustrated in Table 1, any number of tiers of options may be specified for each data class. In Table 1, for example, non-latency sensitive audio may have WiFi family 850 communication capabilities and cellular family 858 capabilities as first tier options for non-latency sensitive audio data/content. Non-latency sensitive audio, in certain embodiments, may include streaming audio, such as audio streamed from a music service provider. Such audio content may not necessarily be latency sensitive because a relatively long delay (e.g. 100s of milliseconds) may be supported before playback starts without the user experience of the audio content being impacted negatively. If the WiFi family 850 and cellular family 858 are not available, then the second-tier options may be selected. In this case, the second-tier options may be any other type of available communication capability. As another example, for latency-sensitive audio, first-tier options may include 5 GHz 854 or 6 GHz 856 communication capabilities. If the 5 GHz 854 and 6 GHz 856 communication capabilities are not available, the second-tier options may include selecting any other available communication capabilities that overlap. In some embodiments, latency-sensitive audio may correspond with home theater audio content (or other content), which may only have a limited amount of time to playback the audio content after a visual frame is rendered. For example, the limited amount of time may be the amount of time beyond which lip-synchrony is not maintained with the lips of the mouth of a character visually rendered on an interface of a media device (e.g., 40 milliseconds).

As another example, in Table 1, the data class including timing information data may have first tier options for communication capabilities including Bluetooth (e.g. either Bluetooth Classic 847 and/or BLE 849), UWB 864, acoustic signaling 872, and/or optical 830 (e.g. infrared communication capability 835). In the event that the first-tier options for timing information are not available, the second-tier options may include allowing for the selection of any other available communication capabilities for communicating the timing information data. In certain embodiments, the timing information may be associated with Simple Network Time Protocol (SNTP) packet information that is utilized to synchronize computer clocks and/or playback clocks in a system, network, or a combination thereof. In certain embodiments, timing information may be any type of timing information used to synchronize output, receipt, display, processing, storing, and/or manipulation of data. As yet another example, in Table 1, the data class associated with data for control commands may include first and second tiers of options that do not indicate any particular preference for a communication capability. In other words, the first and second tiers of communication capability options may allow for the selection of any communication capability that is deemed available when it comes to communicating data associated with control commands. As a further example, in Table 1, data belonging to the data class associated with voice data may have WiFi and/or cellular families 850, 858 as the first-tier options for communicating voice data. If neither the WiFi family 850 nor the cellular family 858 of communication capabilities are available, the second-tier options may allow for the selection of any other communication that is available and overlaps between the playback device 700 and the target device.

In certain embodiments, communication capabilities within each tier may be ranked based on user preference, suitability for transmission and/or receipt of a particular type (or class) of data, the amount of traffic currently being transmitted and/or received via the communication capabilities, conditions associated with communication links for each communication capability, whether devices are already using a particular communication capability, whether a communication capability is disabled or hampered, any desired factor, or a combination thereof. Additionally, in certain embodiments, communication capabilities may be ranked across each tier based on the same factors and/or other factors. For example, first-tier options may be ranked relative to second-tier options and may be factored in determining which communication capability to select for communication certain data. Notably, the above-described hierarchy is only but an example hierarchy that may be utilized to facilitate selection of the best available communication capability for communicating data. Any other type of hierarchy for facilitating selection of the best available communication capability may be utilized instead of the example hierarchy or in combination with the example hierarchy.

Once the best available communication capability is determined during stage 915, the best available communication capability (or highest ranked or optimal communication capability) may be selected by the playback device 700, target device, media playback system 100, and/or by another device, program, and/or system. In FIG. 9, for example, the BLE 849 communication capability may be selected for communication of data between a playback device 700 and/or target device. In such a scenario, the data type of the data to be communicated may have been timing information that may be utilized to synchronize playback of audio content by the playback device 700 and the target device. As additional data is to be communicated between the playback device 700 and target device over time, the stages 905, 910, 915 may be repeated as necessary to determine overlapping communication capabilities, available communication capabilities, and the best available communication capabilities for communicating such data between a playback device 700 and any number of target devices.

Figure 10A:
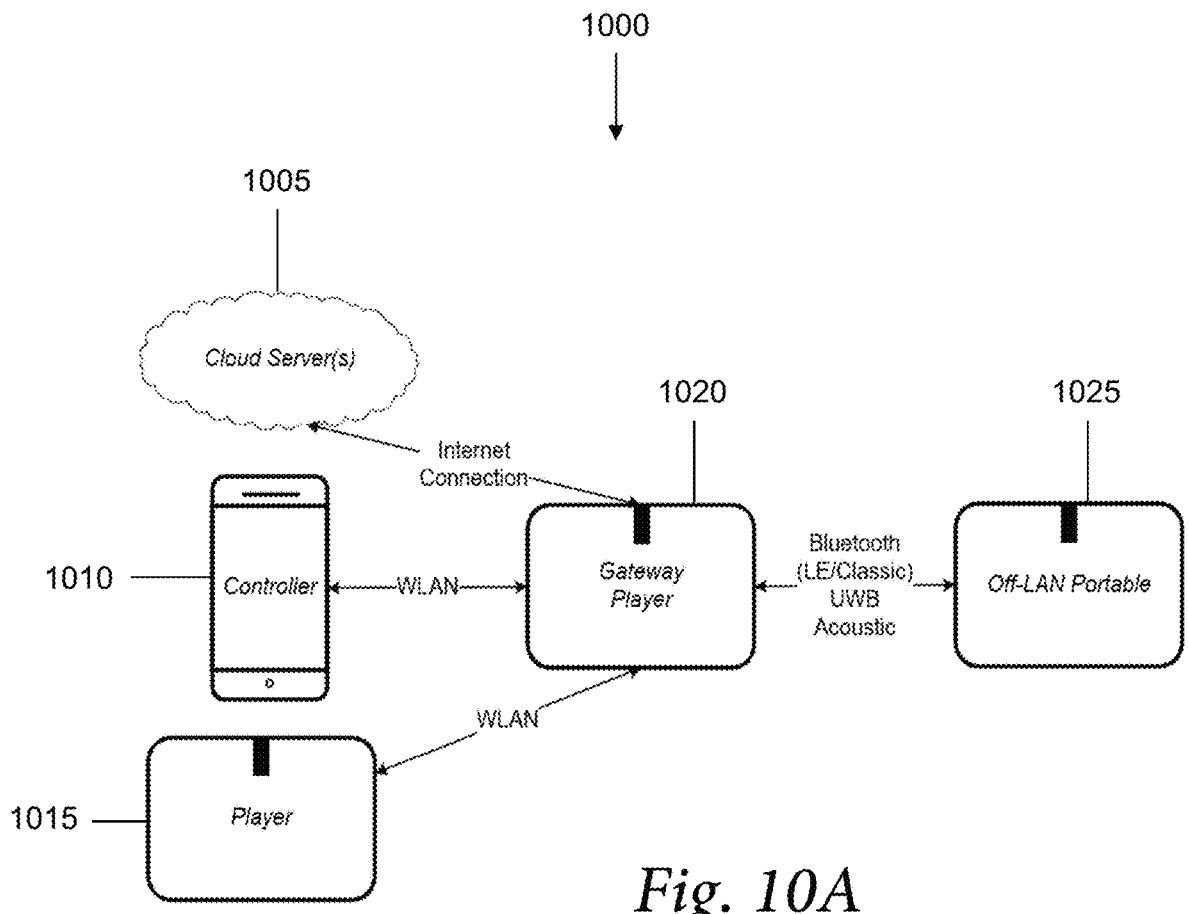
FIG. 10A is a schematic diagram of a system for facilitating communication of data to an off-LAN playback device via a gateway playback device.

Referring now also to FIG. 10A, a schematic diagram of a system 1000 for facilitating communication of data to an off-network (e.g., off-LAN) playback device via a gateway playback device is shown. The system 1000 may facilitate the operation of additional embodiments of the present disclosure. In some embodiments, the system 1000 may be configured to be communicatively linked with and/or include media playback system 100, networks 102, playback device 700, any other network, device, and/or system, or a combination thereof. Illustratively, the system 1000 may include, but is not limited to, a cloud server 1005, a controller 1010, a playback device 1015, a gateway player 1020, an off-LAN (or off-network) portable device, among other devices and/or componentry. The cloud server 1005 may be a server, computing device, and/or any other type of device that may reside within a cloud-computing network and/or system. The cloud server 1005 may be configured to receive requests for data, such as, but not limited to, audio content, visual content, network information (e.g., associated with network conditions experienced in system 1000), device information (e.g., associated with devices in system 1000), and the like. Additionally, the cloud server 1005 may be configured to store any type of data and provide such data or links to data in response to requests from devices of the system 1000.

The controller 1010 may be any type of controller and may incorporate and/or include any of the features and/or functionality of the controller 130a. In some embodiments, the controller 1010 may be configured to receive inputs from a user, program, and/or device correlating with control commands for controlling devices of the system 1000. Such commands may be configured to control the operation of playback device 1015, gateway player 1020, and/or off-LAN portable device 1025. Illustratively, the controller 1010 is shown as a smartphone, however, the controller 1010 may be any type of device, such as, but not limited to, a computer, a laptop, a tablet, a remote-control device, a smartwatch, a wearable device, or a combination thereof. The playback device 1015 may be any type of playback device that may include transducers (e.g. speakers), amplifiers, microphones, any type of componentry of a playback device, or a combination thereof. In certain embodiments, the playback device 1015 may include any of the componentry and/or functionality of playback devices 110 as described herein.

The gateway player 1020 may normally be a playback device (e.g. a playback device 110, 700, 1015) that may be configured to function, when needed, as a gateway between a group of devices on a network, such as a WLAN or other network, and an off-network device, such as Off-LAN portable device 1025. In some embodiments, the gateway player 1020 may serve as a bridge to communicate data and traffic from devices within a network to devices, systems, and/or components that are not on the network. The Off-LAN portable device 1025 may be a playback device or other device configured to facilitate playback of audio content and perform any other operations of a computing device.

In an example scenario, the system 1000 may be configured to support the following use-case scenario. In the example use-case scenario, the controller 1010, the playback device 1015, and the gateway player 1020 may all be communicatively linked to each other via a network, such as a WLAN (e.g. network 102). In some embodiments, the controller 1010, the playback device 1015, and the gateway player 1020 may belong to a household network of a home of a first user. The devices on the WLAN may also be communicatively linked to the cloud server 1005, which may be utilized to serve audio content and/or other data in response to requests. In some embodiments, if the data associated with a request is not resident on the cloud server 1005, the cloud server 1005 may return a link to access the data or may access the data from another system or device and serve the data to the requestor after the data is obtained by the cloud server 1005. The Off-LAN portable device 1025 may be a device that has not connected to the WLAN and/or is incapable of connecting to the WLAN, at least not directly. In some embodiments, the Off-LAN portable device 1025 may be a device belonging to a second user visiting the household of the first user. The first user and/or the second user may want to add the Off-LAN portable device 1025 temporarily to the WLAN of the first user so that the Off-LAN portable device 1025 may play audio content synchronously with devices on the WLAN and/or otherwise interact with the other devices on the WLAN in other ways.

In such a scenario, the gateway player 1020 may function as a gateway for the Off-LAN portable device 1025 to facilitate communication of data from the WLAN to the Off-LAN portable device 1025 and vice versa by a non-WLAN communication mechanism. For example, in the system 1000, an entry may be stored in a routing table for the Off-LAN portable device 1025 that lists an internet protocol (IP) address (and/or media access control (MAC) address) of the gateway player 1020 as the gateway to the WLAN and an identifier of the Off-LAN portable device 1025 (i.e. the target device) that may be included in a payload of a data packet intended for the Off-LAN portable device 1025.

Figure 10B:
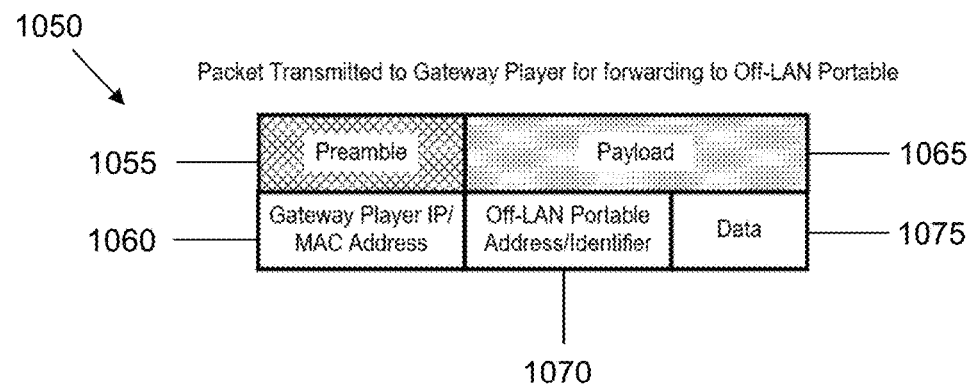
FIG. 10B is a diagram illustrating an example packet for facilitating communication of data to an Off-LAN playback device through a gateway playback device.

An exemplary data packet 1050 for facilitating communication of data to the Off-LAN portable device 1025 is illustrated in FIG. 10B. In FIG. 10B, the data packet 1050 may have a preamble 1055 and a payload 1065. The preamble 1055 may include an identifier 1060 of the gateway player 1020, which for example, may be a device identifier, an IP address corresponding to the gateway player 1020, a MAC address of the gateway player 1020, or a combination thereof. The payload of the data packet may include an identifier 1070 of the Off-LAN portable device, such as a device identifier of the Off-LAN portable device 1025, an IP address corresponding to the Off-LAN portable device 1025, a MAC address of the Off-LAN portable device 1025, or a combination thereof. The payload 1065 may also include data 1075 intended for the Off-LAN portable device 1025, which may be communicated by any of the devices within the WLAN and/or the cloud server 1005. The payload data intended for the Off-LAN portable device 1025 may be a portion of audio content, media content, virtual reality content, augmented reality content, any type of data, or a combination thereof.

Operatively, when a device in the WLAN wants to transmit data, such as audio content or a control command, to the Off-LAN device 1025, one or more data packets may be generated and forwarded to the gateway player 1020. For example, the playback device 1015 may generate a data packet 1050 including a portion of a song in the payload 1065 of the data packet 1050 and may also include an IP address of the gateway player 1020 in the preamble 1055 of the data packet 1050. The data packet 1050 may also include an identifier (e.g. an address or other identifier) of the Off-LAN portable device 1025 in the payload 1065 of the data packet 1050. When the gateway player 1020 receives the data packet 1050 over the WLAN, the gateway player 1020 may strip off the preamble 1055, determine the identifier of the Off-LAN portable device 1025 from the payload 1065, and forward the data 1075 to the Off-LAN portable device 1025 using another mechanism of communication. For example, instead of using the WLAN to transmit the data 1075 to the Off-LAN portable device 1025, the gateway player 1020 may transmit the data 1075 to the Off-LAN portable device using other communication capabilities, such as, but not limited to, BLE, Bluetooth Classic, UWB, Acoustic Signaling, other communication capabilities, or a combination thereof. When the second user (or first user) no longer wishes for the Off-LAN portable device 1025 to receive data from the WLAN, the connection between the Off-LAN portable device 1025 and the gateway player 1020 may be terminated and the gateway player 1020 may stop forwarding data to the off-LAN portable device 1025.

Referring now also to FIGS. 11A and 11B, additional embodiments of the present disclosure are provided herein. For example, FIG. 11A illustrates a flow diagram for a method 1100 for adding a guest player to playback system (e.g., media playback system 100) and FIG. 11B illustrates a flow diagram for a method 1150 for removing a guest player from the media playback system. The methods 1100 and 1150 provide a flexible communication approach that facilitates the temporary integration of a playback device (i.e. a guest player) into a household that may not be on the network of the household (e.g. a WLAN of the household). For example, for method 1100, a guest player (e.g., portable device 1025) may be taken by a first user to a second user's home. The guest player, for example, may be Bluetooth capable, but may not be on the second user's WLAN. A playback device (e.g., playback device 700 or playback device 1015) on the WLAN of the second user may identify the presence of the guest player through any number of techniques, at step 1105. For example, the playback device on the WLAN may detect the presence of the guest player via a BLE broadcast (e.g. via Bluetooth beacon functionality) with information about the playback device and search for the guest player on the WLAN. The search for the guest player on the WLAN may fail because the guest player is not on the WLAN.

At step 1110, the method 1100 may include providing a notification to the playback device of the household and/or to the guest player inquiring as to whether the guest player should be added as a (e.g., temporary) player of the media playback system. If the answer is yes to the inquiry provided in the notification, the method 1100 may include, at step 1115, determining the communication/networking capabilities of the guest player and determining which communication capabilities of the playback device overlap with the communication capabilities of the guest player. A communication capability for facilitating establishment of a connection between the playback device and the guest player may be selected from the set of overlapping communication capabilities and an attempt to establish a connection (e.g. a Bluetooth connection) between the playback device and the guest player may be made. In certain embodiments, for example, when the attempt is made, a prompt may be received at the guest player which prompts the first user to push a button (or make another input) to accept the connection to ensure that the first user (or second user) has control of the guest player. In certain embodiments, the prompt may be received via a controller application installed on the guest player.

If the connection is accepted, the method 1100 may add, at least temporarily, the guest player to the media playback system via the playback device that is serving as a gateway player device for the media playback system, at step 1120. Once the connection is established, the playback device serving as the gateway player devices acts as a bridge for communicating data (e.g. audio) to and from the guest player. and, while the connection with the guest player exists, adds the guest player to the media playback system. In some embodiments, the media playback system and/or the playback device serving as the gateway player may update state information (e.g., comprising a table or other data structure) associated with the media playback system to indicate that the guest player has been added to the media playback system. The state information may be updated (e.g., a new entry may be added to a table) to include information identifying an IP address of the guest player, a MAC address of the guest player, a device type of the guest player, communication capabilities of the guest player, any other information associated with the guest player, or a combination thereof. The state information may also indicate which specific device of the media playback system is connected to the guest player.

In certain embodiments, such as at step 1125 of the method 1100, the updated state information (containing the updated information associated with the guest player) may be replicated to any or all of the devices in the media playback system (e.g., cloud server 1005, controller 1010, playback device 1015, etc.). Notably, once the guest player is part of the media playback system, the guest player may synchronously (or separately) play audio content with other devices of the media playback system, receive data from devices of the media playback system, transmit data to the devices of the media playback system, interact with the media playback system, or a combination thereof, because the guest player is viewed by the media playback system as an available communication destination of the media playback system.

FIG. 11B illustrates a flow diagram for a method 1150 for removing a guest player from a media playback system, such as a media playback system. Using the example above, the method 1150 may continue after the guest player has already been added to the media playback system. Once the first user (or second user) seeks to disconnect the guest player from the media playback system or at the expiration of a designated time, the guest player may be disconnected from the media playback system, such as by terminating the connection between the guest player and the playback device serving as the gateway player device to the media playback system. At step 1155, the method 1150 may include detecting the loss of all connections of the media playback system to the guest player, including the connection between the guest player and the gateway player device. At step 1160, the method 1150 may include providing a notification, via a controller application, of the lost connection to the guest player. The notification may be provided to the guest player and to one or more of the devices of the media playback system.

At step 1165, the method 1150 may include removing the guest player from the media playback system so that the guest player no longer is viewed as an available communication destination of the media playback system. In some embodiments, when the guest player is removed from the media playback system, state information associated with the media playback system may be updated to remove the associated with the guest player so that the guest player is no longer an available communication destination for the media playback system (e.g., an entry associated with the guest player in a table of available players may be removed from the table). At step 1170, the method 1150 may include replicating the updated state information to each device of the media playback system and/or to the cloud server 1005 as well.

Figure 12:
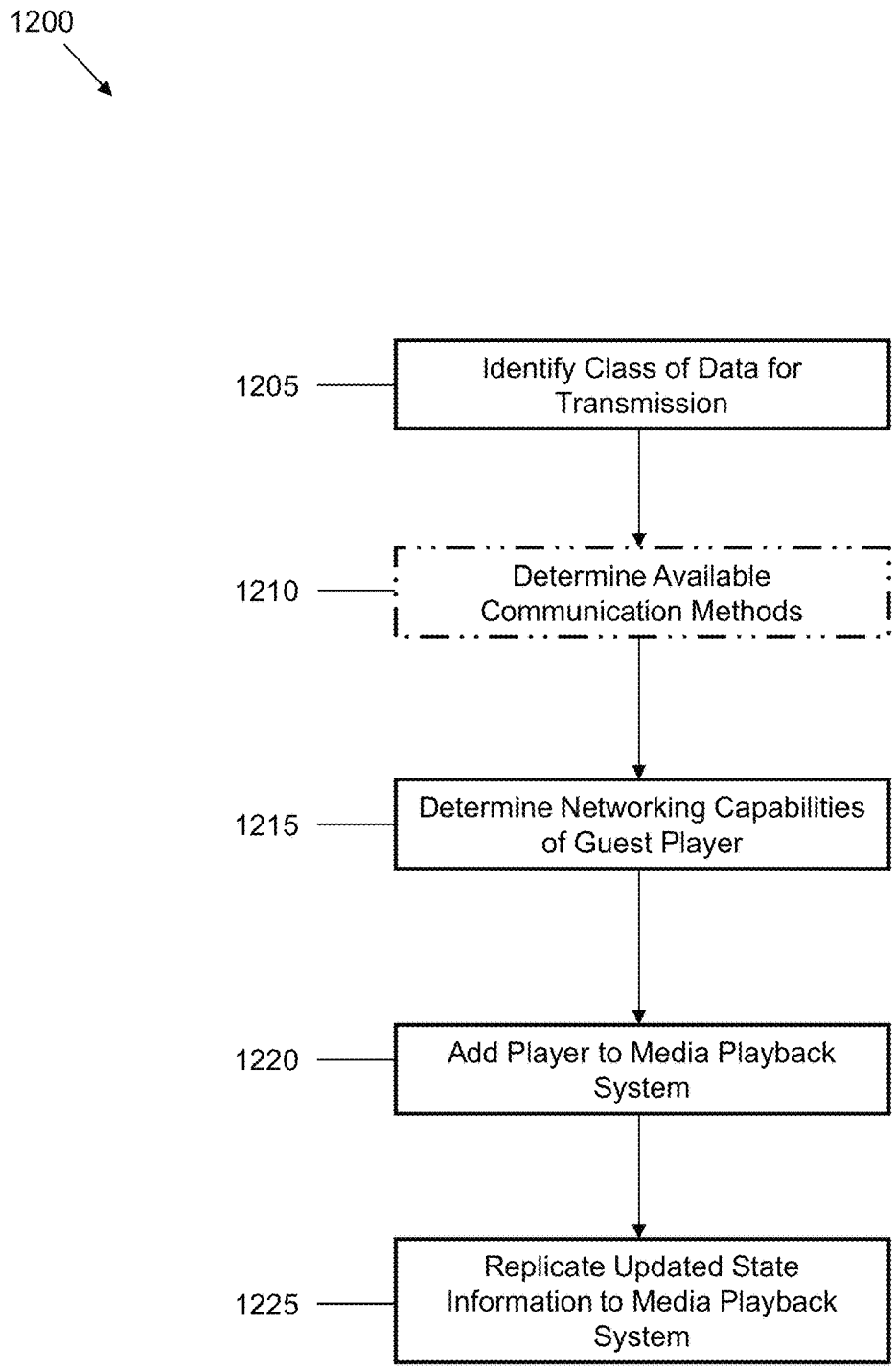
FIG. 12 is a flow diagram for adding a guest playback device to a media playback system according to exemplary embodiments.

Referring now to FIG. 12, a flow diagram of a method 1200 for adding a guest player to a media playback system, such as a media playback system, is illustrated. The method 1200 may include, at step 1205, identifying the class of data to be communicated between a guest player and a playback device of the media playback system. At step 1210, the method 1200 may include determining the communication methods (i.e., capabilities) of the playback device that are available for communication. The availability of communication methods may be based on (i) an indication as to whether the playback device is currently communicating, (ii) sensor data obtained via a sensor associated with the playback device, (iii) a capability of the playback device, (iv) a quality of a connection associated with the playback device, (v) an amount of data traffic traversing to or from the playback device, and/or (vi) a device type of the playback device.

At step 1215, the method 1200 may include determining the communication capabilities of the guest player. Additionally, the method 1200 may include determining which communication capabilities overlap between the guest player and the playback device and which overlapping communication methods are available for communication. In some embodiments, the determination as to whether a communication method is available may be based on one or more of (i) an indication as to whether the playback device and/or guest player are currently communicating, (ii) sensor data obtained via a sensor associated with the playback device and/or guest player, (iii) a capability of the playback device and/or guest player, (iv) a quality of a connection associated with the playback device and/or guest player, (v) an amount of data traffic traversing to or from the playback device and/or to or from the guest player, and/or (vi) a device type of the playback device and/or guest player.

At step 1220, the method 1200 may include adding the guest player to the media playback system. The step 1220 may also include updating state information of the media playback system to include information associated with the guest player and its communication capabilities. The state information may be utilized to indicate that the guest player is an available communication destination of the media playback system. At step 1225, the method 1200 may include replicating the state information to each device (e.g. playback devices, NMDs, controllers, transducers, etc.) in the media playback system and/or to a cloud server 1005 communicatively linked to the media playback system. By replicating the state information to the media playback system and/or to the cloud server 1005, transmission and/or support of control commands may be facilitated and/or transmission of data, such as audio content, may also be facilitated and/or supported.

Notably, the present disclosure may include additional functionality and features. For example, when determining whether a particular communication capability is available for communication, the media playback system 100, the playback devices (e.g. playback device 700), and/or target devices may determine and factor in a variety of contextual information to facilitate the determination. In some embodiments, input from sensors, such as, but not limited to, accelerometers, motion sensors, imaging sensors, presence sensors, compasses, location sensors, proximity sensors, temperature sensors, gyroscopes, any other sensors, or a combination thereof, may be utilized to determine contextual information associated with the playback device and/or a target device that the playback device seeks to communicate with. With regard to accelerometer sensor data, such sensor data may indicate whether the playback device 700 and/or target device are moving or stationary. In certain embodiments, motion of a device that is detected based on sensor data from accelerometers may serve to provide contextual information that a particular communication method is unavailable (e.g. acoustic signaling). Similarly, if proximity sensor data indicates that the playback device 700 and target devices are a threshold distance away from each other, perhaps Bluetooth communication may be deemed as unavailable.

As another example, orientation data from gyroscopes of the playback device 700 and/or target devices may indicate that the orientation of the devices with respect to each other indicates that acoustic signaling and/or other communication capabilities may be less effective and are unavailable for communicating data. As a further example, sensor data from location sensors may indicate that the playback device 700 and target device are in different rooms, and, as a result, acoustic signaling, Bluetooth, and/or infrared communication capabilities may be unavailable. Similarly, imaging sensors may provide image data that indicates the environment that the playback device 700 and/or target device are located in and that certain communication capabilities are unavailable in such environments.

Context as it relates to the playback device 700 and/or target device may also be determined based on determining the capabilities of the target device and/or playback device 700. For example, it may be determined that the target device is a much older device than the playback device 700, and, as a result, is incapable of communicating using 5 GHz WiFi or 5G cellular. On the other hand, the target device may be determined to be a more robust device than the playback device 700 and may have a greater number of available communication capabilities than the playback device 700. Context may also be determined based on the class or type of device that the playback device 700 and/or target device are. For example, it may be determined the playback device 700 is a playback device that includes a transducer, microphone, and/or user interface for receiving inputs from a user. The target device, on the other hand, may be a controller, a mobile device, a cloud device, or some other device that is different from the playback device 700. Based on the differences between the target device and playback device 700, certain communication capabilities may be deemed unavailable or may be deemed superior to other communication capabilities. For example, if the target device is a controller, infrared communication capabilities may be preferred over another communication capability.

In some embodiments, context may also be determined based on the type of data that is to be transmitted. For example, audio content, visual content, augmented reality content, virtual reality content, informational content, control commands, and/or any other type of content may dictate that type of communication capability that is deemed available and/or superior to another communication capability. In some embodiments, context may also be based on the quality of a given connection and/or the amount and/or type of data traffic on the connection. For example, if there is a threshold amount of traffic being transmitted over a particular communication capability, it may be determined that the communication capability is unavailable or at least not preferred. As another example, if the connection is currently being used to transport high-priority content, such as audio, the communication capability associated with the connection may be deemed unavailable as well. Still further, if there are other types of traffic to be transmitted over a particular communication capability, such information may factor into the context. For example, if the playback device 700 is currently functioning as a group coordinator for a group of devices in a media playback system 100 and transmitting audio content to one or more group members over a WLAN, then the WiFi communication capability may be deemed unavailable.

In certain embodiments, audio streaming data, voice samples, synchronization data, and control signals may have different priorities with respect to their network requirements. Additionally, Quality of Service, throughput, and latency can affect each type of data differently. For optimal communication of each type of data, the choice of which communications transport/capability may be evaluated against the priorities of the specific type of data, the state/conditions of each communications transport link, traffic, scheduling, and the costs (financial, power, or other).

In further embodiments, the media playback system 100, the playback device 700, the target device, and/or other systems described herein may analyze the context, communication capabilities, sensor data, communicated data, and/or any other information to predict the communication capabilities of a target device, predict which communication capabilities will be available, and/or which communication capabilities will be the best/optimal/highest ranked for a given situation. As target devices are joined to and/or removed from a media playback system, for example, the characteristics of the target device, the data communicated while the target device was a part of the media playback system, the communication capabilities used to communicate the data, the network conditions experienced during communication of the data, sensor data, and/or other information may be continuously fed into an artificial intelligence/machine learning model. The model may then use such information to predict context, which communication capability will be available, which communication capability will be best suited for communicating certain types of data, when a target device will join a media playback system, when a target device will leave a media playback system, how a particular target device behaves, how much data will be communicated, the type of data that will be communicated, or a combination thereof.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device, comprising:
a plurality of communication interfaces supporting a first plurality of communication capabilities including at least two of: an optical communication capability, a radio frequency communication capability, or an acoustic communication capability;
one or more amplifiers;
one or more processors; and
at least one non-transitory computer-readable medium comprising program instructions that are executable by the one or more processors such that the playback device is configured to:
identify a data type of data that is to be communicated from the playback device to a target device, the data type comprising one of: non-latency sensitive audio, latency sensitive audio, timing information, a control command, voice data, video data, augmented reality data, or virtual reality data;
after identifying the data type, determine a second plurality of communication capabilities of the target device, the second plurality of communication capabilities including at least two of the optical communication capability, the radio frequency communication capability, or the acoustic communication capability;
determine a set of communication capabilities of the first plurality of communication capabilities that overlap with the second plurality of communication capabilities of the target device;
determine a subset of communication capabilities of the set of communication capabilities that are available for communicating the data between the playback device and the target device, wherein the subset of communication capabilities that are determined to be available are determined to be available based on a context associated with at least one of: the playback device or the target device;
determine, based on the data type of the data, a highest ranked communication capability from the subset of communication capabilities for communicating the data between the playback device and the target device;
communicate the data between the playback device and the target device using the highest ranked communication capability; and
facilitate playback of audio associated with the data by using the one or more amplifiers.

2. The playback device of claim 1, wherein the at least one non-transitory computer-readable medium further comprises instructions that are executable by the one or more processors such that the playback device is configured to map the set of communication capabilities of the first plurality of communication capabilities that overlap with the second plurality of communication capabilities of the target device in a table.

3. The playback device of claim 1, wherein the at least one non-transitory computer-readable medium further comprises instructions that are executable by the one or more processors such that the playback device is configured to determine the subset of communication capabilities based on the context associated with the playback device, wherein the context of the playback device comprises one or more of (i) an indication as to whether the playback device is currently communicating, (ii) sensor data obtained via a sensor associated with the playback device, (iii) the data type, (iv) a quality of a connection associated with the playback device, (v) an amount of data traffic traversing to or from the playback device, or (vi) a device type of the playback device.

4. The playback device of claim 1, wherein the at least one non-transitory computer-readable medium further comprises instructions that are executable by the one or more processors such that the playback device is configured to determine the subset of communication capabilities based on the context associated with the target device, wherein the context of the target device comprises one or more of (i) an indication as to whether the target device is currently communicating, (ii) sensor data obtained via a sensor associated with the target device, (iii) the data type, (iv) a quality of a connection associated with the target device, (v) an amount of data traffic traversing to or from the target device, or (vi) a device type of the target device.

5. The playback device of claim 1, wherein the at least one non-transitory computer-readable medium further comprises instructions that are executable by the one or more processors such that the playback device is configured to adjust the communicating of the data in real time based at least in part on one or more of (i) changes in the highest ranked communication capability, (ii) changes in the context of the playback device, (iii) changes in the context of the target device, (iv) changes in rankings of communication capabilities in the subset of communication capabilities, or (v) changes in the subset of communication capabilities.

6. The playback device of claim 1, wherein the at least one non-transitory computer-readable medium further comprises instructions that are executable by the one or more processors such that the playback device is configured to define a hierarchy for each data type of data to be communicated between the playback device and the target device.

7. The playback device of claim 1, wherein the at least one non-transitory computer-readable medium further comprises instructions that are executable by the one or more processors such that the playback device is configured to assign a priority level to each communication capability of the first and second plurality of communication capabilities in accordance with each data type of data to be communicated between the playback device and the target device.

8. The playback device of claim 1, wherein the target device comprises at least one of: a target playback device, a controller, a cloud-based device, a television, a mobile device, or a tablet.

9. The playback device of claim 1, wherein the data comprises the audio, the target device is a playback device, and wherein the playback device plays back the audio in synchrony with the target device.

10. A tangible, non-transitory computer-readable medium comprising instructions, which, when executed by one or more processors, cause a computing system to be configured to:
    identify a data type of data that is to be communicated to a target device from a playback device supporting a first plurality of communication capabilities, wherein the data type comprises one of: non-latency sensitive audio, latency sensitive audio, timing information, a control command, voice data, video data, augmented reality data, or virtual reality data, and wherein the first plurality of communication capabilities includes at least two of: an optical communication capability, a radio frequency communication capability, or an acoustic communication capability;
    after identifying the data type of the data, determine a second plurality of communication capabilities of the target device, wherein the second plurality of communication capabilities includes at least two of the optical communication capability, the radio frequency communication capability, or the acoustic communication capability;
    determine a first set of communication capabilities of the first plurality of communication capabilities that overlap with the second plurality of communication capabilities of the target device;
    determine a first subset of communication capabilities of the second plurality of communication capabilities that are available for communicating the data between the playback device and the target device, wherein the first subset of communication capabilities that are determined to be available are determined to be available based on a context associated with at least one of: the playback device or the target device;
    determine, based on the data type of the data, a first highest ranked communication capability from the first subset of communication capabilities for communicating the data between the playback device and the target device;
    communicate the data between the playback device and the target device using the first highest ranked communication capability; and
    facilitate playback of audio associated with the data by using one or more amplifiers of the playback device.

11. The tangible, non-transitory computer-readable medium of claim 10, further comprising instructions which, when executed by the one or more processors, cause the computing system to be configured to:
    determine whether the target device is not connected to a local area network connected to the playback device.

12. The tangible, non-transitory computer-readable medium of claim 11, further comprising instructions which, when executed by the one or more processors, cause the computing system to be configured to:
    cause, if the target device is not connected to the local area network, the playback device to function as a gateway for the target device to bridge data traffic coming from the local area network to the target device.

13. The tangible, non-transitory computer-readable medium of claim 12, further comprising instructions which, when executed by the one or more processors, cause the computing system to be configured to:
    communicate the data traffic coming from the local area network to the target device via the playback device functioning as the gateway by removing a preamble portion of a data packet associated with the data traffic and identifying the target device via a target device identifier present in a payload portion of the data packet.

14. The tangible, non-transitory computer-readable medium of claim 12, further comprising instructions which, when executed by the one or more processors, cause the computing system to be configured to:
    identify a presence of a different target device via a short-range wireless broadcast.

15. The tangible, non-transitory computer-readable medium of claim 14, further comprising instructions which, when executed by the one or more processors, cause the computing system to be configured to:
    determine a third plurality of communication capabilities of the different target device; and
    determine a second set of communication capabilities of the third plurality of communication capabilities of the different target device that overlap with the first plurality of communication capabilities of the playback device.

16. The tangible, non-transitory computer-readable medium of claim 15, further comprising instructions which, when executed by the one or more processors, cause the computing system to be configured to:
    determine a second subset of communication capabilities of the second set of communication capabilities that are available for communicating different data between the playback device and the different target device, wherein the second subset of communication capabilities that are determined to be available are determined to be available based on the context associated with the playback device, a context associated with the different target device, or a combination thereof;
    determine, based on the data type of the different data, a second highest ranked communication capability from the second subset of communication capabilities for routing the different data between the playback device and the different target device; and communicate the different data between the playback device and the target device using the second highest ranked communication capability.

17. The tangible, non-transitory computer-readable medium of claim 12, further comprising instructions which, when executed by the one or more processors, cause the computing system to be configured to:
dynamically adjust communicating of the data as the context of the playback device, the context of the target device, or a combination thereof, change.

18. The tangible, non-transitory computer-readable medium of claim 12, wherein the context of the playback device comprises an orientation of the playback device, a motion of the playback device, whether the playback device is operating, whether the playback device is performing an action, or a combination thereof, and wherein the context of the target device comprises an orientation of the target device, a motion of the target device, whether the target device is operating, whether the target device is performing an action, or a combination thereof.

19. A method performed by a playback device, the method comprising:
identifying a data type of data that is to be communicated to a target device from a playback device supporting a first plurality of communication capabilities that includes at least two of an optical communication capability, a radio frequency communication capability, or an acoustic communication capability, wherein the data type comprises at least one of: non-latency sensitive audio, latency sensitive audio, timing information, a control command, voice data, video data, augmented reality data, or virtual reality data;
after identifying the data type, determining a second plurality of communication capabilities of the target device, the second plurality of communication capabilities including at least two of the optical communication capability, the radio frequency communication capability, or the acoustic communication capability;
determining a set of communication capabilities of the second plurality of communication capabilities of the target device that overlap with the first plurality of communication capabilities of the playback device;
determining a subset of communication capabilities of the set of communication capabilities that are available for communicating data between the playback device and the target device, wherein the subset of communication capabilities that are determined to be available are determined to be available based on a context associated with the playback device, a context associated with the target device, or a combination thereof;
determining, based on the data type of the data, a highest ranked communication capability from the subset of communication capabilities for routing the data between the playback device and the target device; and
communicating the data between the playback device and the target device using the highest ranked communication capability.

* * * * *